United States Patent
Borchardt et al.

(10) Patent No.: US 9,744,706 B2
(45) Date of Patent: Aug. 29, 2017

(54) METHODS OF MAKING MELT-BONDED THERMOPLASTIC BAGS WITH TAILORED BOND STRENGTH

(71) Applicant: The Glad Products Company, Oakland, CA (US)

(72) Inventors: Michael G. Borchardt, Willowbrook, IL (US); Shaun T. Broering, Fort Thomas, KY (US); Robert H. Turner, Cincinnati, OH (US); David Hoying, Cincinnati, OH (US); Daniel C. Peck, Mason, OH (US); Robert T. Dorsey, Willowbrook, IL (US); Matthew W. Waldron, West Chester, OH (US); Robert W. Fraser, Lombard, IL (US)

(73) Assignee: The Glad Products Company, Oakland, CA (US)

( * ) Notice: Subject to any disclaimer, the term of this patent is extended or adjusted under 35 U.S.C. 154(b) by 426 days.

(21) Appl. No.: 14/337,483

(22) Filed: Jul. 22, 2014

(65) Prior Publication Data
US 2014/0334749 A1 Nov. 13, 2014

Related U.S. Application Data

(63) Continuation-in-part of application No. 13/299,177, filed on Nov. 17, 2011, now Pat. No. 9,186,862,
(Continued)

(51) Int. Cl.
*B29C 47/06* (2006.01)
*B32B 7/04* (2006.01)
(Continued)

(52) U.S. Cl.
CPC ...... *B29C 47/0064* (2013.01); *B29C 47/0026* (2013.01); *B29C 47/0059* (2013.01);
(Continued)

(58) Field of Classification Search
CPC ..... B29C 47/0064; B29C 66/21; B32B 7/045; B32B 37/0076; B32B 2307/5825
(Continued)

(56) References Cited

U.S. PATENT DOCUMENTS 3,957,566 A * 5/1976 Rahlfs ................. B29C 47/0023
156/244.14
4,522,675 A * 6/1985 Sharps, Jr. .......... B29C 47/0023
156/244.11
(Continued)

*Primary Examiner* — Atul P. Khare
(74) *Attorney, Agent, or Firm* — Thomas C. Feix

(57) ABSTRACT

One or more implementations of a multi-layered bag with reinforced seals include an outer layer or bag and an inner layer or bag positioned within the outer layer or bag. The multi-layered bag further includes a draw tape positioned near the opening of the multi-layered bag. The draw tape can allow a user to at least partially close the multi-layered bag by drawing the layers of the bag together. The multi-layered bag further includes one or more tape seals that bond the draw tape to layers of the bag. The tape seals can be reinforced and include at least seven plies bonded together. One or more implementations further include methods of forming multi-layered bags with reinforced seals.

16 Claims, 21 Drawing Sheets

Related U.S. Application Data which is a continuation-in-part of application No. 12/947,025, filed on Nov. 16, 2010, now Pat. No. 8,603,609, which is a continuation-in-part of application No. 12/881,825, filed on Sep. 14, 2010, now Pat. No. 9,469,443.

(60) Provisional application No. 61/261,673, filed on Nov. 16, 2009.

(51) Int. Cl.
*B29C 47/00* (2006.01)
*B65D 33/00* (2006.01)
*B32B 37/00* (2006.01)
*B32B 27/08* (2006.01)
*B32B 27/18* (2006.01)
*B32B 27/30* (2006.01)
*B32B 27/32* (2006.01)
*B32B 3/06* (2006.01)
*B29L 31/00* (2006.01)
*B29L 9/00* (2006.01)
*B29K 23/00* (2006.01)
*B29K 25/00* (2006.01)

(52) U.S. Cl.
CPC .............. *B29C 47/065* (2013.01); *B32B 3/06* (2013.01); *B32B 7/045* (2013.01); *B32B 27/08* (2013.01); *B32B 27/18* (2013.01); *B32B 27/302* (2013.01); *B32B 27/32* (2013.01); *B32B 27/327* (2013.01); *B32B 37/0076* (2013.01); *B65D 33/00* (2013.01); *B29K 2023/06* (2013.01); *B29K 2023/065* (2013.01); *B29K 2023/0625* (2013.01); *B29K 2023/12* (2013.01); *B29K 2025/06* (2013.01); *B29L 2009/00* (2013.01); *B29L 2031/7128* (2013.01); *B32B 2264/102* (2013.01); *B32B 2264/104* (2013.01); *B32B 2264/107* (2013.01); *B32B 2307/31* (2013.01); *B32B 2307/41* (2013.01); *B32B 2307/412* (2013.01); *B32B 2307/414* (2013.01); *B32B 2307/5825* (2013.01); *B32B 2307/7163* (2013.01); *B32B 2307/746* (2013.01); *B32B 2439/46* (2013.01)

(58) Field of Classification Search
USPC .......................... 264/209.3, 515; 156/244.13
See application file for complete search history.

(56) References Cited

U.S. PATENT DOCUMENTS

| | | | | |
|---|---|---|---|---|
| 4,615,858 | A * | 10/1986 | Su | ........................ B29C 47/0026 264/130 |
| 4,981,734 | A * | 1/1991 | Akao | ........................ B32B 7/04 428/349 |
| 5,358,785 | A * | 10/1994 | Akao | ........................ B29C 65/02 428/349 |
| 5,804,020 | A * | 9/1998 | Akao | ........................ B29C 65/02 156/244.19 |
| 5,824,417 | A | 10/1998 | Smith et al. | |
| 5,919,547 | A | 7/1999 | Kocher et al. | |
| 6,479,116 | B1 | 11/2002 | Small, Jr. et al. | |
| 7,314,669 | B2 | 1/2008 | Galloway | |
| 8,603,609 | B2 * | 12/2013 | Fraser | ................. B32B 37/0076 428/166 |
| 2011/0117307 | A1 * | 5/2011 | Fraser | ................. B32B 37/0076 428/66.6 |
| 2012/0033900 | A1 * | 2/2012 | Fraser | ....................... B32B 7/02 383/105 |
| 2012/0039550 | A1 * | 2/2012 | MacPherson | ............. B32B 7/14 383/109 |
| 2012/0063706 | A1 * | 3/2012 | Fraser | ................. B29C 66/1122 383/109 |
| 2013/0202853 | A1 * | 8/2013 | Bergman | ................ B29C 55/18 428/167 |

* cited by examiner

METHODS OF MAKING MELT-BONDED THERMOPLASTIC BAGS WITH TAILORED BOND STRENGTH

CROSS-REFERENCE TO RELATED APPLICATIONS

The present application is a continuation-in-part of U.S. patent application Ser. No. 13/299,177 filed Nov. 17, 2011 and entitled Multi-Layered Lightly-Laminated Films and Methods of Making the Same, which is a continuation-in-part of U.S. patent application Ser. No. 12/947,025 filed Nov. 16, 2010 and entitled Discontinuously Laminated Film and issued on Dec. 10, 2013 as U.S. Pat. No. 8,603,609, which claims the benefit of U.S. Provisional Application No. 61/261,673, filed Nov. 16, 2009. The present application is a continuation-in-part of U.S. patent application Ser. No. 12/881,825 filed Sep. 14, 2010 and entitled Multilayer Plastic Film. The contents of each of the above-referenced applications and patent are hereby incorporated by reference in their entirety.

BACKGROUND

1. Technical Field

The present invention relates generally to thermoplastic films and bags formed therefrom. More particularly, the present invention relates to melt-bonded films with tailored bond strength.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength, tear resistance, and/or impact resistance of a thermoplastic film.

Co-extruded films are a common type of film used in many thermoplastic products. Commonly, co-extruded films include a core layer sandwiched between outer skin-layers. The core layer is commonly the thickest layer and provides the foundation for the film. The outer skin layers are often tailored to provide desired properties. To help ensure adequate film strength, conventionally strong lamination strength is provided between the layers of co-extruded films to help avoid delamination. In many instances, manufacturers use a tie layer or other adhesive layer to ensure adequate lamination strength between layers. Poorly laminated films are often avoided because the can have unacceptable properties.

The cost to produce products including thermoplastic film is directly related to the cost of the thermoplastic film. Recently the cost of thermoplastic materials has risen. In response, many manufacturers attempt to control manufacturing costs by decreasing the amount of thermoplastic material in a given product.

One way manufacturers may attempt to reduce production costs is to use thinner films, thereby reducing the amount of thermoplastic film needed to produce a product of a given size. Unfortunately, stretched or otherwise thinner thermoplastic films can have undesirable properties. For example, thinner thermoplastic films are typically weaker. As such, manufacturers may be dissuaded to use thinner films despite the potential material savings. This is particularly the case when strength is a desired feature in the product.

SUMMARY

One or more implementations of the present invention provide benefits and/or solve one or more of the foregoing or other problems in the art with melt-bonded thermoplastic films with tailored bond strength. For example, one or more implementations provide for tailoring a bond strength between adjacent layers of a melt-bonded film. In particular, the lamination strength can be purposefully weakened such that forces acting on the melt-bonded film are first absorbed by breaking the bond between layers rather than, or prior to, tearing or otherwise causing the failure of the layers of the melt-bonded film. Such implementations can provide an overall thinner film employing a reduced amount of raw material that nonetheless has maintained or increased strength parameters. Alternatively, such implementations can use a given amount of raw material and provide a film with increased strength parameters.

For example, in one or more embodiments a method of forming a multi-layered thermoplastic bag with tailored bond strength between the layers of the bag involves extruding a first thermoplastic layer of film and extruding a second thermoplastic layer of film. The second thermoplastic layer of film is incompatible with the first thermoplastic layer of film. The method further involves joining the first thermoplastic layer of film directly to the second thermoplastic layer of film while each of the first and second thermoplastic layers of film are in a melt state. The method also involves solidifying the joined first thermoplastic layer of film and second thermoplastic layer of film to form a melt-bonded film with a bond strength between the first thermoplastic layer of film and the second thermoplastic layer of film that is less than a weakest tear strength of the first thermoplastic layer of film and the second thermoplastic layer of film. Additionally, the method involves forming the melt-bonded film into a thermoplastic bag.

In addition to the foregoing, one or more embodiments of a multi-layered bag includes a first layer of a first thermoplastic material and a second layer of a second thermoplastic material positioned adjacent the first layer. The first layer includes first and second side walls joined along a bottom edge, a first side edge, and an opposing second side edge. The second includes first and second side walls joined along a bottom edge, a first side edge, and an opposing second side edge. The second thermoplastic material is incompatible with the first thermoplastic material. The multi-layered bag further includes a first heat seal securing the first side edges of the first and second layers together and a second heat seal securing the second side edges of the first and second layers together. Furthermore, the multi-layered bag includes a melt-bond securing the first layer to the second layer. The melt bond has a bond strength less than a weakest tear strength of the first layer of the first thermoplastic material and less than a weakest tear strength of the second layer of the second thermoplastic material.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
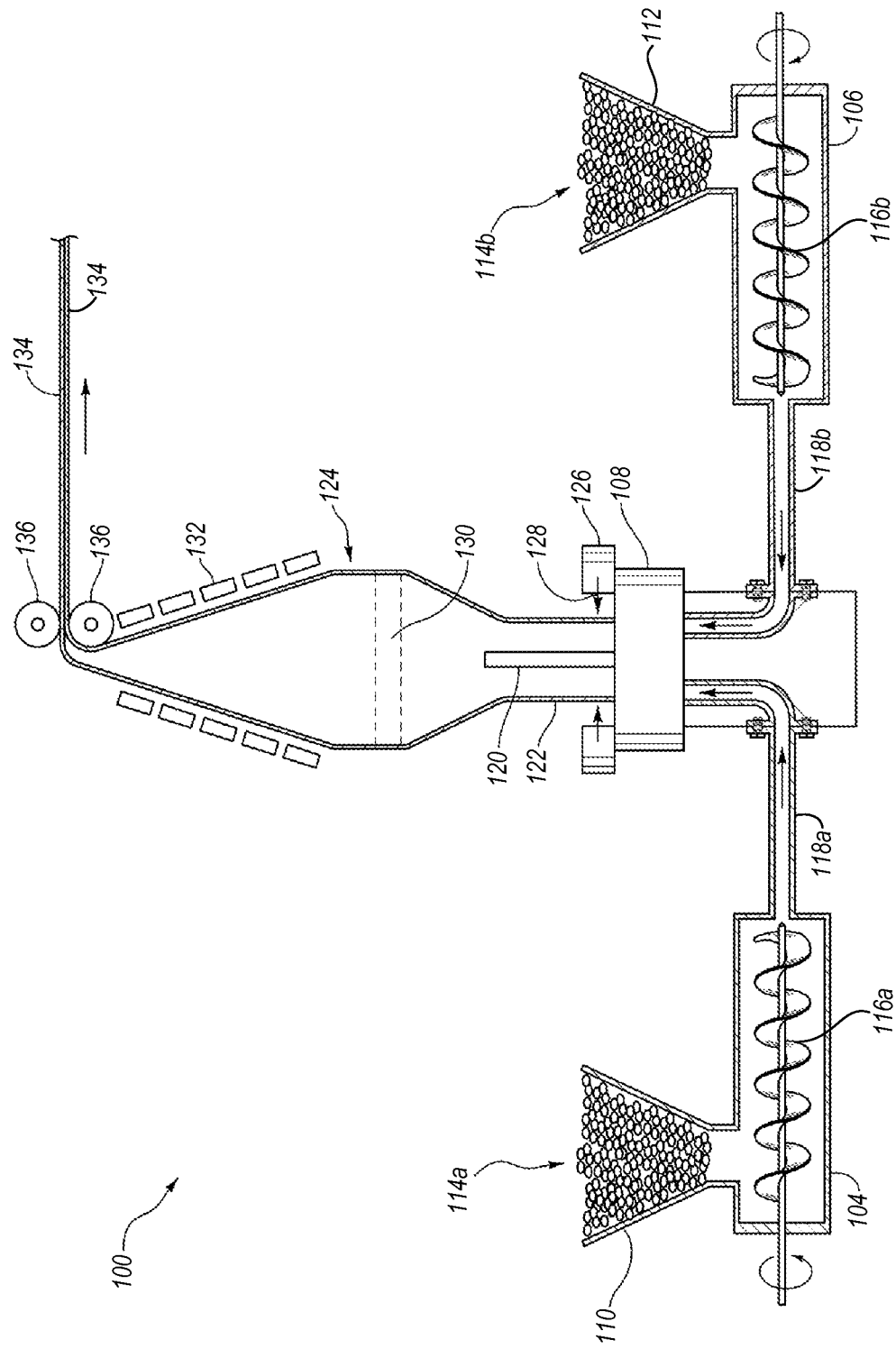
FIG. 1 shows a schematic side-view of a blow molding extruder for producing a melt-bonded film bonded within the die in accordance with one or more implementations of the present invention.

One or more implementations of the present invention include melt-bonded thermoplastic films with tailored bond strength between layers of the film. For example, one or more implementations provide for tailoring the bond strength between adjacent layers of a melt-bonded film. In particular, the bond strength can be purposefully tailored or controlled such that forces acting on the melt-bonded film are first absorbed by breaking the bond between layers rather than, or prior to, tearing or otherwise causing the failure of the layers of the melt-bonded film. Such implementations can provide an overall thinner film employing a reduced amount of raw material that nonetheless has maintained or increased strength parameters. Alternatively, such implementations can use a given amount of raw material and provide a film with increased strength parameters.

In particular, the bonds or bond regions of adjacent layers of melt-bonded films or bags in accordance with one or more implementations can act to first absorb forces via breaking of the bonds prior to allowing that same force to cause failure of the individual layers of the film. Such action can provide increased strength to the film. In one or more implementations, the bonds or bond regions include a bond strength that is advantageously less than a weakest tear resistance of each of the individual films so as to cause the bonds to fail prior to failing of the film layers. Indeed, one or more implementations include bonds that the release just prior to any localized tearing of the layers of the film. Additionally or alternatively, one or more implementations, the bonds or bond regions include a bond strength that is advantageously less than a puncture resistance of each of the individual films so as to cause the bonds to fail prior to the failing of the film layers. Indeed, one or more implementations include bonds that the release just prior to any localized puncturing of the layers of the film.

Thus, one or more embodiments include a melt-bonded film having layers that will begin to separate as an impact force is applied to the melt-bonded film. The energy required to break the bonds between the layers of the melt-bonded film can absorb or dissipate at least a portion of the impact force, thereby avoiding, reducing, or delaying tearing or puncturing of the film. Furthermore, after the de-bonding of the layers of the melt-bonded film, subsequent impact forces may need to puncture through two layers of film separated by a finite distance, which can result in a further energy absorption or dissipation and less molecular damage to the layers of the melt-bonded film. Thus, one or more embodiments of a melt-bonded film with tailored bond strength can have increased tear and puncture resistance compared to two films Thus, in one or more implementations, the bonds or bond regions of a melt-bonded film can fail before either of the individual layers undergo molecular-level deformation. For example, an applied strain can pull the bonds or bond regions apart prior to any molecular-level deformation (stretching, tearing, puncturing, etc.) of the individual film layers. In other words, the light bonds or bond regions can provide less resistive force to an applied strain than molecular-level deformation of any of the layers of the film.

The inventors have surprisingly found that such a configuration of light bonding can provide increased strength properties to the film as compared to a film with a monolayer equal thickness or a multi-layer film in which the plurality of layers are tightly bonded together. Thus, in one or more implementations the combined layers of the melt-bonded film may use less material than a conventional film, but nonetheless have maintained or increased strength parameters provided by the layers of the melt-bonded film working in concert with each other.

As used herein, the terms "lamination," "laminate," and "laminated film," refer to the process and resulting product made by bonding together two or more layers of film or other material. The term "bonding," when used in reference to bonding of multiple layers of a multi-layer film, may be used interchangeably with "lamination" of the layers. According to methods of the present invention, adjacent layers of a multi-layer film are laminated or bonded to one another. In one or more implementations, the bonding purposely results in a relatively weak bond between the layers that has a bond strength that is less than the strength of the weakest layer of the film. This allows the lamination bonds to fail before the film layer, and thus the film, fails.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multi-layer structure. As a noun, "laminate" means a product produced by the affixing or adhering just described.

As used herein the term "melt-bonded film" refers to a film having at least two layers bonded to each other during the film formation process. In particular, "melt-bonded film" refers to film in which two layers are joined, combined, or brought directly together while each is in an at least partially molten state prior to solidifying. As explained in greater detail below, a "melt-bonded film" can comprise a co-extruded film. Alternatively, a "melt-bonded film" can comprise film in which the layers are brought together after passing out of the die, but before solidifying. Furthermore, a "melt-bonded film" comprises a film having a bond strength between layers that is tailored or otherwise controlled during the film formation process so as to be weak such the film will act to first absorb forces via breaking of the bonds prior to allowing that same force to cause failure of the individual layers of the film. Additionally, one or more embodiments optionally also include post formation processing (i.e., processing of a film after the film as solidified) to further tailor or control the bond between layers of a melt-bonded film.

As the layers of a "melt-bonded" film are joined or combined while in a melt state, in one or more implementations a melt-bonded film includes molecular entanglement of the polymer chains of the two layers. As such, when layers of a melt-bonded film, having molecular entanglement of the polymer chains of the two layers, are separated, the separation may include adhesive failure. In other words, in such embodiments when the layers of the melt-bonded film are separated, there is not a clean separation of the melt-bonded layers. In alternative embodiments, based on the incompatibility of the layers or other factors, when layers of a melt-bonded films, are separated, the separation may include only cohesive failure, resulting in a clean separation of the melt-bonded layers. One will appreciate in light of the disclosure herein that a manufacturer can tailor the melt-bond to dictate whether the melt-bonds will break cleanly or not.

One or more implementations include controlling or otherwise tailoring the melt bond between two layers through the selection of the thermoplastic materials for each layer. In particular, in one or more implementations include melt bonding incompatible thermoplastic materials. As used herein "incompatible thermoplastic materials," "incompatible materials," or incompatible polymers" refer to polymers that resist bonding such that when melt-bonded directly together a strength of the bond is less than a weakest tear resistance or weakest puncture resistance of either of the layers. For example, polar and non-polar polymers are one example of incompatible polymers. Exemplary incompatible polymer pairs include, but are not limited to, polyethylene (e.g., low-density polyethylene ("LDPE"), linear low density polyethylene ("LLDPE"), high density polyethylene ("HDPE")) and polypropylene ("PP"), polyethylene and poly(hexano-6-lactam) ("Nylon 6"), polyethylene and polyethylene terephthalate ("PET"), polyethylene and polycarbonate ("PC"), polyethylene and Ethylene vinyl alcohol ("EVOH"), polyethylene and polystyrene ("PS"). Another example of an incompatible polymer pair is LLDPE and HDPE with dissimilar melt indices. For example, if the LLDPE has a melt index about 4 times larger than a melt index of the HDPE, the LLDPE and HDPE may be incompatible.

Additionally or alternatively, to control or tailor a melt bond between layers, a thermoplastic material compatible with outer incompatible materials can be positioned between the outer incompatible layers to facilitate a bond between the incompatible outer layers. The inner layer can comprise a material, gauge, bonding temperature or other characteristic that ensure that the bond between the inner layer and outer layers is purposefully weak as explained above. For example, a melt-bonded film with tailor bond strength can include outer layers of compatible material and an incompatible inner layer with poor thickness uniformity so that the outer layers bond where they contact at thin points of the incompatible inner layer.

Another method of controlling the strength of a melt bond between two incompatible layers involves including a thermoplastic material that is compatible with each layer to allow the incompatible layers to bond together. For example, PE and PP are normally incompatible, however by adding a PP copolymer that is compatible with both PE and PP in both the PE and PP layers can cause the two incompatible layers to bond. To control the strength of the melt bond, the manufacturer can adjust the concentration of the compatible material to achieve the desired level of lamination strength.

Alternatively, a method of controlling the strength of a melt bond between two layers involves including one or more additives to compatible materials that may cause the compatible materials to resist bonding. The additives may include anti-block additives that may resist the tendency of the layers to adhere or stick together. Anti-blocking agents may be organic or inorganic materials that may be added to the thermoplastic material when it is mixed and extruded or molded from resin, or may be added after the thermoplastic webs have been formed. Examples of inorganic anti-blocking additives may include talc (magnesium silicate), calcium carbonate, silica (silicon dioxide (SiO2)), spheres (such as, manmade spheres; for example, zeospheres or ceramic spheres (alumina-silicate ceramic)), kaolin/clay (aluminum silicate), mica (aluminum potassium silicate), other materials, or combinations thereof. The presence of anti-blocking additives at the surfaces of the layers may tend to cause a roughening effect so that the adjacent surfaces may not be in perfect surface-to-surface contact with each other along their entire surface areas. Examples of organic anti-block additives may be bis-amide (ethylene bisstearamide (EBS)), secondary amide (stearyl erucamide), primary amide (stearamide, erucamide), organic stearate (glycerol monostearate (GMS)), metallic stearate (zinc stearate), silicone, PTFE, or other materials, or combinations thereof. The anti-block additive may be a combination of inorganic and organic materials. One example of an anti-block additive is Formulation 100526 marketed by Ampacet Corporation. For example, Ampacet Formulation 100526 may include two anti-block materials: microtalc (talc), and acrawax C (ethylene bisstearamide).

Other additives may include process aids. For example, the layers may include a slip additive. The slip additive may be a fatty acid. The slip additive may be long-chain fatty acid amides, with amides from oleyl (single unsaturated C-18) through erucyl (C-22 single unsaturated). One additive may be Formulation 10919 marketed by Ampacet Corporation. Ampacet Formulation 10919 may include a 3% loading of Dynamar. Dynamar is a fluoroelastomer and may prevent melt fracture during the extrusion process. The layers may include pigments. The layers may include fillers, such as, inorganic materials, such as, calcium carbonate, or organic materials, such as, starches. The materials may be particles, such as, spherical particles, shaped particles, or nanoparticles.

Additionally, one or more implementations include controlling or otherwise tailoring the melt bond between two layers of a melt-bonded film through post formation processing, such as cold deformation. For example, one or more implementations include ring rolling, performing a structural elastic like film process ("SELFing"), embossing, or preforming combinations thereof on a melt-bonded film to further tailor the strength of the bond between the layers. In particular, one or more implementations include tailoring a bond strength of a melt-bonded film by intermittingly separating the first layer from the second layer to form discontinuous melt bonds. One will appreciate that prior to deformation, a melt-bonded film can include a continuous melt-bond between layers (i.e., a bond that is co-extensive with the bonding surfaces such that the entire bonding surfaces are bonded together).

Thus, the melt bonding between layers of a multi-layer film may be continuous or non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film. Or alternatively, random bonded areas broken up by random un-bonded areas. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

Film Materials

As a preliminary matter, implementations of the present invention are described herein primarily with reference to processing and combining of thermoplastic films or webs. One will appreciate, however, that thermoplastic films or webs, are only one type of "structure" which a user may process using the components, systems, and methods described herein. For example, multi-layered bags of one or more implementations can include not only thermoplastic films, as such, but also paper, woven or non-woven fabrics, or other structures. Reference herein, therefore, to thermoplastic films or webs, as such, is primarily for convenience in description.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In one or more implementations web materials are provided which exhibit an "elastic-like" behavior in the direction of applied strain without the use of added traditional elastic. As used herein, the term "elastic-like" describes the behavior of web materials which, when subjected to an applied strain, the web materials extend in the direction of applied strain, and when the applied strain is released the web materials return, to a degree, to their pre-strained condition.

Indeed, implementations of the present invention can include any flexible or pliable thermoplastic material that may be formed or drawn into a web or film. Furthermore, the thermoplastic materials may include a single layer or multiple non-distinct layers. Examples of multi-layered films suitable for use with one or more implementations of the present invention include coextruded multi-layered films, multiple films continuously laminated together, and multiple films partially or discontinuously laminated together. The thermoplastic material may be opaque, transparent, translucent, or tinted.

In one or more embodiments of the present invention melt-bonded films can be gas impermeable. In other words, the melt-bonded films of one or more embodiments do not contain voids or pin holes. One will appreciate that such films can be suitable for use as containers or bags in which it is desirable to avoid the passing of liquids or gases through the film.

In at least one implementation of the present invention, one or more layers of a melt-bonded film can comprise linear low-density polyethylene. The term "linear low density polyethylene" as used herein is defined to mean a copolymer of ethylene and a minor amount of an alkene containing 4 to 10 carbon atoms, having a density of from about 0.910 to about 0.926 g/cm3, and a melt index (MI) of from about 0.5 to about 10. For example, one or more implementations of the present invention can use an octene co-monomer, solution phase LLDPE (MI=1.1; $\rho$=0.920). Additionally, other implementations of the present invention can use a gas phase LLDPE, which is a hexene gas phase LLDPE formulated with slip/AB (MI=1.0; $\rho$=0.920). One will appreciate that the present invention is not limited to LLDPE, and can include "high density polyethylene," "medium density polyethylene (MDPE)," "low density polyethylene," and "very low density polyethylene." MDPE is defined by a density range of 0.926-0.940 g/cm$^3$. MDPE can be produced by chromium/silica catalysts, Ziegler-Natta catalysts or metallocene catalysts. VLDPE is defined by a density range of 0.880-0.915 g/cm$^3$. VLDPE is a substantially linear polymer with high levels of short-chain branches, commonly made by copolymerization of ethylene with short-chain alpha-olefins (for example, 1-butene, 1-hexene and 1-octene). VLDPE is most commonly produced using metallocene catalysts due to the greater co-monomer incorporation exhibited by these catalysts. Indeed one or more layers of a melt-bonded film made from any of the below mentioned thermoplastic materials or combinations thereof can be suitable for use with the present invention.

Such thermoplastic materials can include, but are not limited to, thermoplastic polyolefins, including polyethylene and copolymers thereof and polypropylene and copolymers thereof. The olefin-based polymers including ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins. Other examples of polymers suitable for use as films include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly (ethylene-vinyl acetate), poly(ethylene-methyl acrylate), poly(ethylene-acrylic acid), poly(ethylene butyl acrylate), polyurethane, poly(ethylene-propylene-diene), ethylene-propylene rubber.

Other examples of polymers suitable for use as films in accordance with the one or more implementations of the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinyl acetate), poly(ethylene-methyl acrylate), poly(ethylene-acrylic acid), poly(ethylene butyl acrylate), polyurethane, poly(ethylene-propylene-diene), ethylene-propylene rubber, and combinations thereof.

In addition to the foregoing, one will appreciate in light of the disclosure herein that manufacturers may form the films or webs using a wide variety of techniques. For example, a manufacturer can form the films using conventional flat or cast extrusion or co-extrusion to produce monolayer, bi-layer, or multi-layer films. Alternatively, a manufacturer can form the films using suitable processes, such as, a blown film process to produce bi-layer, or multi-layer films. If desired for a given end use, the manufacturer can orient the films by trapped bubble, tenterframe, or other suitable process. Additionally, the manufacturer can optionally anneal the films.

In one or more implementations an extruder can be used to form the film. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment. In one or more implementations, a manufacturer can use multiple extruders to supply different melt streams, which a feed block can order into different channels of a multi-channel die. The multiple extruders can allow a manufacturer to form a multi-layered film with layers having different compositions.

Figure 2:
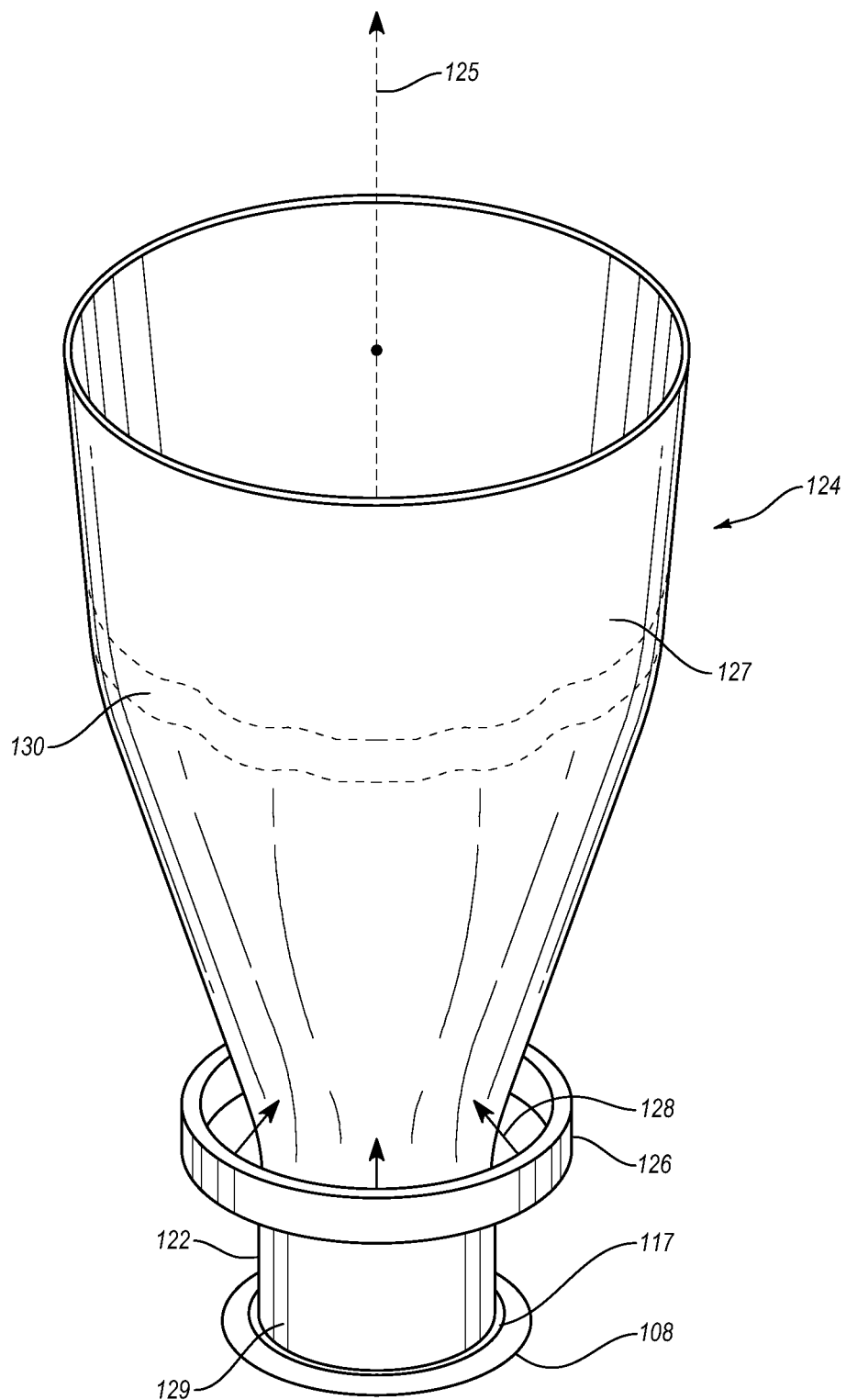
FIG. 2 shows a perspective view of a portion of a blow-formed film tube formed in the extruder of FIG. 1 in accordance with one or more implementations of the present invention.

FIG. 1 illustrates a schematic sectional, side view of a blown film extrusion system 100 used to produce a blown-formed continuous film tube 102 of polyethylene or other thermoplastic material. FIG. 2 illustrates a perspective view of a portion of the film tube 119 formed by the extrusion process 100 of FIG. 1. Processes for the manufacture of blown film tubes are generally known. Blown film extrusion processes are described, for example, in U.S. Pat. Nos. 2,409,521, 2,476,140, 2,634,459, 3,750,948, 4,997,616, 5,213,725, and 5,700,489; each of which is incorporated herein by reference in their entirety.

A manufacturer can use a blown film extrusion process to manufacture a melt-bonded film in accordance to one or more embodiments of the present invention. For example, FIGS. 1-3 together illustrate a blown film extrusion system 100 suitable for producing a co-extruded melt-bonded film. The blown film extrusion system 100 can include a first screw extruder 104 (or simply extruder 104) and a second screw extruder 106 (or simply extruder 106) that may communicate with a common matrix or die 108. Each extruder 104, 106 may include a respective hopper 110, 112 into which thermoplastic resin material 114*a*, 114*b* can be added. The hoppers 110, 112 may feed the resin material into respective cylindrical bores of each extruder 104, 106. The extruders 104, 106 may heat the resin to a viscous liquid or liquid-like state in which the resin is readily flowable. Located in the respective bores of the extruders 104, 106 may be respective rotating screws 116*a*, 116*b* which, when turned, drive the thermoplastic resin 114*a*, 114*b* to the die 108 via pipe lines or channels 118*a*, 118*b*.

Each of the extruders 104, 106 can supply a different thermoplastic material or resin 114*a*, 114*b* to the die 108. For example, extruder 104 can provide a first thermoplastic material 114*a* and extruder 106 can provide a second thermoplastic material 114*b*. As explained above, in one or more implementations the first thermoplastic material 114*a* can be incompatible with the second thermoplastic material 114*b*. In one or more embodiments, the extrusion process can orient the polymer chains of the first and second thermoplastic materials 114*a*, 114*b*. In particular, the extrusion process can cause the polymer chains of the first and second thermoplastic materials 114*a*, 114*b* to be predominantly oriented in the machine direction.

Figure 3:
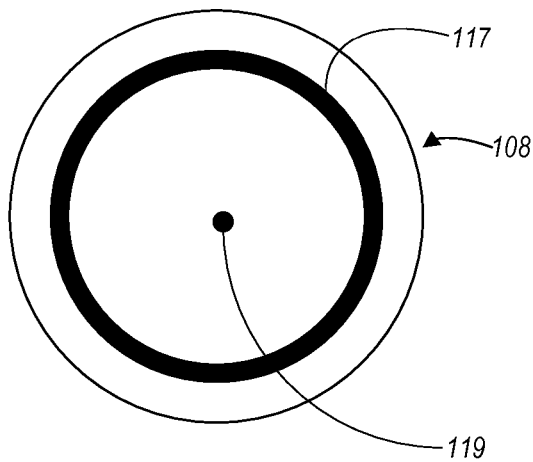
FIG. 3 illustrates a top view of the extrusion die of the blow molding extruder of FIG. 1 in accordance with one or more implementations of the present invention.

To form the film in layers as disclosed herein, the die 108, as illustrated in FIGS. 2 and 3, may have disposed on its top surface an annular ring or die gap 117. The annular ring 117 can comprise a slot or channel through which the molten thermoplastic materials may be extruded. The die 108 may also include a gas hole 119 (FIG. 3) that leads to a pressurizing pipe or air outlet 120 (FIG. 1). The annular ring 117 may receive a first material 114*a* from the first extruder 104 and a second material 114*b* from the second extruder 106. The die 108 can combine the first and second materials 114*a*, 114*b* before they exit the annular ring 117. In other words, the die 108 can bring a first at least partially molten or fully molten material 114*a* in contact with a second at least partially molten or fully molten material 114*b*. Thus, the first and second materials 114*a*, 114*b* can be combined into a single film in which the first and second materials 114*a*, 114*b* are co-extensively bonded together. In one or more embodiments, the first and second materials 114*a*, 114*b* may not mix together except at the interface of the layer of the first material 114*a* and the layer of the second material 114*b*. In the blown film extrusion process, the combined thermoplastic materials 114*a*, 114*b* are extruded from the annular ring 117 of the die 108 to form a molten bubble, some times referred to as a tubular stalk 122. Thus, the molten bubble that exits annular ring 117 may have a first layer of the first thermoplastic material 114*a* and a second layer of the second thermoplastic material 114*b*.

The tubular stalk 122 can thereafter be expanded to fully form a continuous cylindrically shaped film tube 124 exiting and moving away from the die 108. As shown in FIG. 2, film tube 124 includes a tube central axis 125 along the length of film tube 124. The film tube 124 also includes an outside surface 127. By blowing air into the inside of the moving tubular stalk 122 through pressurizing pipe 125 (FIG. 2) within the interior of stalk 122, a pressure is produce inside the tubular stalk 122 that is higher than the external pressure outside the tubular stalk 122. The higher inside pressure causes the moving tubular stalk 122 to expand into the fully formed continuous cylindrical web of the film tube 124. Optionally, the air can be re-circulated within the tubular stalk 122.

In the blown film process, the die 108 can be an upright cylinder with a circular opening. Rollers 136 can pull molten plastic upward away from the die. An air-ring 126 can cool the film as the film travels upwards. The air outlet 120 can force compressed air into the center of the extruded circular profile, creating a bubble. The air can expand the extruded circular cross section by a multiple of the die diameter. This ratio is called the "blow-up ratio." The process of blowing up the tubular stock or bubble can further orient the polymer chains of the first and second thermoplastic materials 114*a*, 114*b*. In particular, the blow-up process can cause the polymer chains of the first and second thermoplastic materials 114*a*, 114*b* to be bi-axially oriented. Despite being bi-axially oriented, in one or more embodiments the polymer chains of the first and second thermoplastic materials 114*a*, 114*b* are predominantly oriented in the machine direction (i.e., oriented more in the machine direction than the transverse direction).

As shown, an annular shaped air ring cooler 126, circumscribing stalk 122 that blows cooling air, as indicated by arrows 128, toward the outside surface 129 of stalk 122 to cool and aerodynamically support the moving molten thermoplastic melt forming tubular stalk 122. By regulating the temperature of the cooling air exiting air ring cooler 126 and other manufacturing parameters, a frost line region 130 is established circumferentially at a static location on the extruder. The frost line region 130 is the location beyond the air ring cooler 126 where the molten plastic melt forming the film tube 124 solidifies through cooling as film tube 124 moves away from air ring cooler 126. At this frost line region 130, film tube 124 no longer expands since the molten thermoplastic melt forming film tube 124 is solidified. Thus, by time the film tube 124 solidifies, the layer of the first thermoplastic material 114*a* can be melt bonded to the layer of the second thermoplastic material 114*b*. The continuous web of film tube 124 is collapsed at a collapsing frame 132 (FIG. 1) and subsequently formed into a flat film tube 124 at nip rollers 136. The film tube 124 can be cut into two or more melt-bonded films 134.

Once the thermoplastic tube 124 has been carried upwards from the die 108 some predetermined height, the thermoplastic material may sufficiently cool to form a solid thermoplastic sheet. The specific location at which the material transition occurs will be dependent upon factors such as the thickness of the cylindrical sheet, the type of thermoplastic material, and the pressure of the gas. Thus, while FIGS. 1 and 2 illustrate the frost line 130 before the rollers 136, in alternative embodiments the frost line 130 can be after the rollers 136 such that a melt bond is created as the layer of the first thermoplastic material 114*a* and the layer of the second thermoplastic material 114*b* pass through the rollers 136.

In one or more implementations, a manufacturer can use multiple extruders to supply different melt streams, which a feed block can order into different channels of a multi-channel die. The multiple extruders can allow a manufacturer to form a multi-layered film with layers having different compositions. Thus, while FIG. 1 illustrates two extruders that produce a two layer co-extruded film, alternative embodiments can produce a three, four, five, or other multi-layered co-extruded melt-bonded film. In alternative embodiments, rather than extrude vertically upward, the processes can involve extruding a film into a water bath or other cooling medium.

Figure 4:
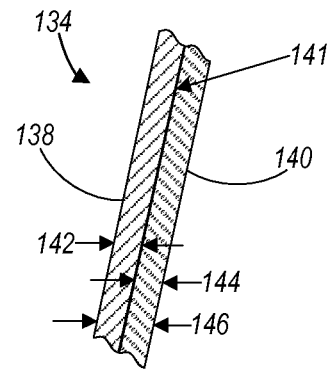
FIG. 4 illustrates a cross-sectional view of a two-layer melt-bonded film in accordance with one or more implementations of the present invention.

Referring now to FIG. 4, an embodiment of a melt-bonded film 134 is shown. The melt-bonded film 134 can include a first layer 138 of a first thermoplastic material 114a that is melt-bonded to a second layer 140 of a second thermoplastic material 114b. In particular, a melt-bond 141 can secure the first layer 138 to the second layer 140. The melt-bond 141 can have a bond strength that is relatively weak, so as to be less than the weakest tear resistance of the individual layers 138, 140 of the melt-bonded film 134. Thus, the melt bond is broken rather than (or before) an individual layer tears upon application of a force. Typically, tearing in the MD direction requires less applied force than tearing in the TD direction, thus in one embodiment, the melt bond strength is less than the MD tear resistance of each individual layer 138, 140 of the melt-bonded film 134.

As shown by FIG. 4, the melt-bond 141 can be co-extensive with the interface between the first and second layers 138, 140. Alternatively, the melt-bond 141 can be non co-extensive or non continuous between the interface of the layers 138, 140. Additionally, the in one or more embodiments, as described above, the melt bond 141 can include a molecular entanglement of the polymer chains of the first thermoplastic material 114a of the first layer 138 and polymer chains of the second thermoplastic material 114b of the second layer 140. Alternatively, the melt-bond cannot include molecular entanglement of the polymer chains of the first thermoplastic material 114a of the first layer 138 and polymer chains of the second thermoplastic material 114b of the second layer 140.

As mentioned above, the strength of the melt-bond 141 can be controlled the particular materials of the first and second layers 138, 140. For example, in one or more embodiments the first thermoplastic material 114a of the first layer 138 is incompatible with the second thermoplastic material 114b of the second layer 140. In particular, in one or more embodiments of the first thermoplastic material 114a of the first layer 138 comprises linear low density polyethylene and the second thermoplastic material 114b of the second layer 140 comprises one of polystyrene, polypropylene, or a polyethylene with a melt index one-fourth or less than a melt index of the linear low-density polyethylene of the first thermoplastic material 114a of the first layer 138. The first thermoplastic material 114a of the first layer 138 can comprise very low density polyethylene with a low molecular weight olefin based copolymer, such as, that marketed by Dow Chemical Company under the trade name Flexomer™ 9066 and the second thermoplastic material 114b of the second layer 140 can comprise linear low density polyethylene, such as, that marketed by Dow Chemical under the trade name Dowlex™ 2045.

The first layer 138 and the adjacent second layer 140 may be of the same or different thicknesses. The first layer 138 may have a thickness 142. The thickness 142 may have a first range from about 0.00005 inches (0.000127 cm) to about 0.01 inches (0.0254 cm), a second range from about 0.0001 inches (0.000254 cm) to about 0.005 inches (0.0127 cm), and a third range from about 0.0002 inches (0.000508 cm) to about 0.002 inches (0.00508 cm). In one embodiment, the thickness 142 may be about 0.0005 inches (0.00127 cm). The second layer 140 may have a thickness 144. The thickness 144 may have a first range from about 0.00005 inches (0.000127 cm) to about 0.01 inches (0.0254 cm), a second range from about 0.0001 inches (0.000254 cm) to about 0.005 inches (0.0127 cm), and a third range from about 0.0002 inches (0.000508 cm) to about 0.002 inches (0.00508 cm). In one embodiment, the thickness 144 may be about 0.0003 inches (0.000762 cm). The melt-bonded film 134 may have a thickness 146. The thickness 146 may have a first range from about 0.0001 inches (0.000254 cm) to about 0.01 inches (0.0254 cm), a second range from about 0.0002 inches (0.000508 cm) to about 0.005 inches (0.0127 cm), and a third range from about 0.0004 inches (0.000102 cm) to about 0.003 inches (0.00762 cm). In one embodiment, the thickness 146 may be about 0.0008 inches (0.00203 cm). In alternative embodiments, the thickness or gauge 146 of the melt-bonded film can be between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. In further implementations, the starting gauge of the films may be greater than about 20 mils.

Figure 5:
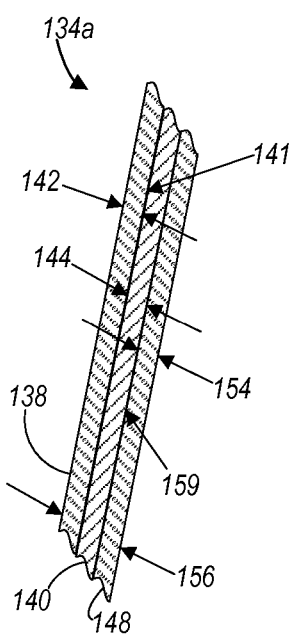
FIG. 5 illustrates a cross-sectional view of a three-layer melt-bonded film in accordance with one or more implementations of the present invention.

As mentioned previously, embodiments of the present invention can include more than two melt-bonded layers. For example, FIG. 5 illustrates another embodiment of a melt-bonded film 134a. The melt-bonded film 134a can include a first layer 138 of a first thermoplastic material 114a that is melt-bonded to a second layer 140 of a second thermoplastic material 114b. In particular, a melt-bond 141 can secure the first layer 138 to the second layer 140. The melt-bond 141 can have a bond strength that is relatively weak, so as to be less than the weakest tear resistance of the individual layers 138, 140 of layers bonded together by the melt-bond 141. Thus, the melt bond is broken rather than (or before) an individual layer tears upon application of a force. Typically, tearing in the MD direction requires less applied force than tearing in the TD direction, thus in one embodiment, the melt bond strength is less than the MD tear resistance of each individual layer 138, 140 of the melt-bonded film 134. The first thermoplastic material 114a of the first layer 138 can be incompatible with the second thermoplastic material 114b of the second layer 140.

Additionally, the melt-bonded film 134a can include a third layer 148 of a thermoplastic material that is melt-bonded to the second layer 140 of the second thermoplastic material 114b. In particular, a melt-bond 159 can secure the third layer 148 to the second layer 140. The melt-bond 159 can have a bond strength that is relatively weak, so as to be less than the weakest tear resistance of the individual layers 148, 140 bonded together by the melt-bond 159.

In one or more embodiments the thermoplastic material of the third layer 148 can be incompatible with the second thermoplastic material 114b of the second layer 140. For example, the thermoplastic material of the third layer 148 can be the same material as the first thermoplastic material 114a of the first layer 138. In such embodiments the strength of the melt bond 141 can be equal or approximately equal to the strength of the melt bond 159. Alternatively, the thermoplastic material of the third layer 148 can differ from the first thermoplastic material 114a of the first layer 138 while still being incompatible with the second thermoplastic material 114b of the second layer 140. In one or more embodiments the outer layers 138, 148 comprise polyethylene (such as LLDPE) and the inner layer comprises polystyrene, polypropylene, or a HDPE with a melt index one-fourth or less than a melt index of the linear low-density polyethylene, or vice versa. As shown by FIG. 5, the melt-bonded film 134a can have layers of incompatible material that are directly bonded to each other. In other words, the melt-bonded film 134a can be devoid of tie layers between layers of incompatible material. For example, the inner layer 140 can be directly melt-bonded to the outer layers 138, 148 without tie layers there between.

In one or more embodiments, a manufacturer can tailor the strengths of the melt bonds 141 and 159 to be different. For example, the manufacturer can cause the strength of the melt bond 141 to be greater than the strength of the melt bond 159. As such, a force applied to the melt-bonded film 134a can first cause the melt bond 159 to break leading to the separation of the second and third layers 140, 148. Breaking of the melt bond 159 can absorb at least a portion of the force applied to the melt-bonded film 134a. The force can then cause the melt bond 141 to break. Breaking of the melt bond 141 can absorb at least an additional portion of the force applied to the melt-bonded film 134a and lead to the separation of the first and second layers 138, 140. Delamination and separation of the layers may allow the layers to move or slide with respect to each other. An advantage of allowing the layers to delaminate and partially separate from each other when such forces are applied to the web may be an increased resistance to tearing or puncture due to energy absorption of the delaminating layers.

As shown by FIG. 5, the first layer 138 of the melt-bonded film 134a may have a thickness 142 as discussed above in relation to FIG. 4. Similarly, the second layer 140 can have a thickness 144 as discussed above in relation to FIG. 4. The third layer 148 may have a thickness or gauge 154. The thickness 154 may have the same dimensional information as thickness 142. The thicknesses 142, 144, 154 can all be the same or they can all differ. Alternatively, the thickness of the second inner layer 140 can be thinner or thicker than the gauges 142, 154 of the outer layers 138, 148. The melt-bonded film 134a may have a thickness 156. The thickness 156 may have the same dimension as the thickness 146.

Figure 6:
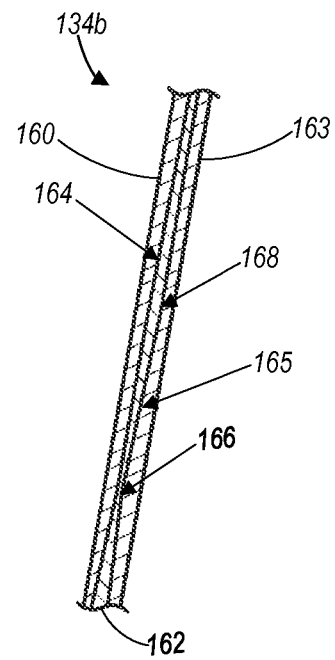
FIG. 6 illustrates a cross-sectional view of a three-layer melt-bonded film with non-uniform thickness or gauge in accordance with one or more implementations of the present invention.

FIGS. 4 and 5 each show melt-bonded films 134, 134a with layers 138, 140, 148 with uniform thicknesses or gauges. One will appreciate in light of the disclosure herein that the present invention is not so limited. For example, FIG. 6 illustrates a melt-bonded film 134b with layers of non-uniform thickness. The melt-bonded film 134b can include a first layer 160, a second layer 162, and a third layer 163. One or more of the layers 160, 162, 163 can have a variable thickness. The variable thickness of the layers 160, 162, 163 can help control the strength of melt bonds 164, 165 between the layers 160, 162, 163. For example, the outer layers 160, 163 can comprise materials that are compatible with each other. The inter layer 162 can comprise a material that is incompatible with the outer layers 160, 163. The inner layer 162 can have a variable thickness. For example, the inner layer 162 can include thinner areas 166 and thicker areas 168. The thicker areas 168 can cause a weak melt bond 164, 165 while the thinner areas 166 can create a stronger melt bond 164, 165 between the layers.

In one or more embodiments, the inner layer 162 can comprise LLDPE. A manufacturer can create a non-uniform thickness in the LLDPE inner layer 162 by causing melt fracture of the LLDPE inner layer 162 during extrusion. For example, the manufacturer an omit fluoroelastomers (such as Dynamar) from the inner layer 162 that may prevent melt fracture during the extrusion process. Extruding a LLDPE layer 162 devoid of a fluoroelastomer or other additive that prevents melt-fracture can cause the LLDPE to wet against the metal die 108 during extrusion giving the LLDPE layer 162 a non-uniform thickness. In other words, the exclusion of a fluoroelastomer or other additive that prevents melt-fracture can cause melt fracture of the LLDPE layer 162 during extrusion.

Figure 7:
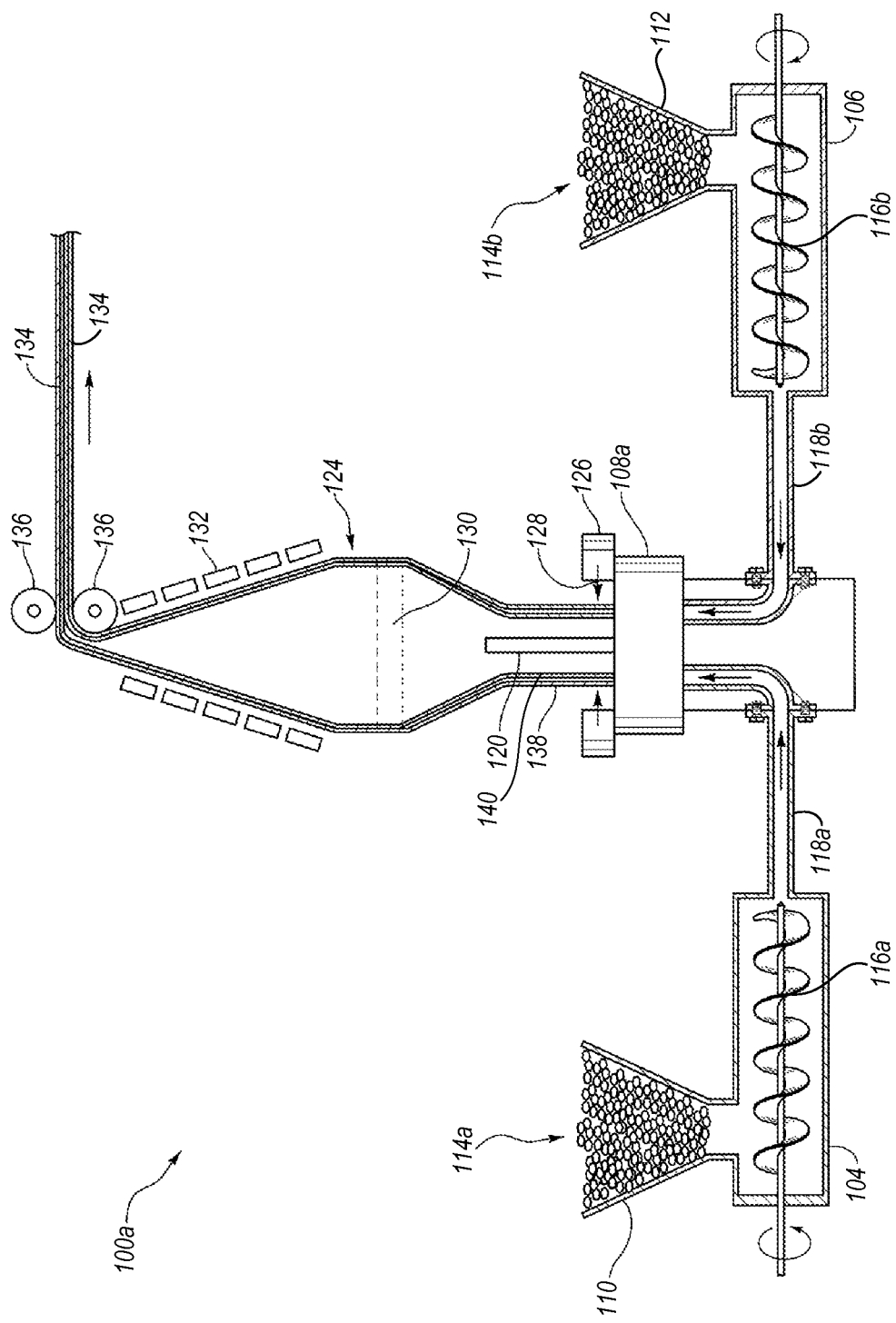
FIG. 7 shows a schematic side-view of a blow molding dual-extruder for producing a melt-bonded film bonded outside of the die in accordance with one or more implementations of the present invention.
Figure 8:
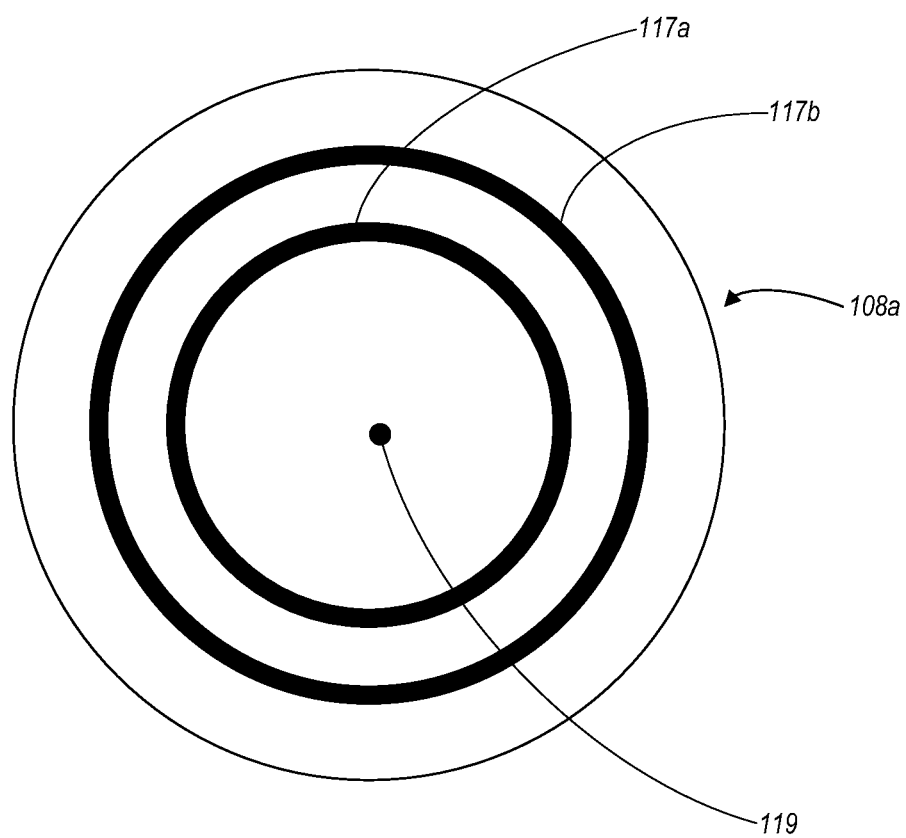
FIG. 8 illustrates a top view of the extrusion die of the blow molding dual-extruder of FIG. 7 in accordance with one or more implementations of the present invention.

FIGS. 1-3 and the related description describe methods of forming melt-bonded films with tailored bond strength having melt-bonds formed during extrusion. One will appreciate that the present invention is not so limited. FIGS. 7 and 8 and the related description describe methods of forming melt-bonded films with tailored bond strength having melt-bonds formed after the extrusion process. FIG. 7 is similar to FIG. 1 albeit that the die 108a is configured to prevent the first thermoplastic material 114a from contacting or bonding with the second thermoplastic material 114b in the die 108a in contrast to the die 108 described herein above.

In particular, as illustrated by FIG. 8, the die 108a may have disposed on its top surface an inner annular ring 117a and an outer annular ring 117b that surrounds the smaller inner ring 117a. The rings 117a, 117b may be formed as slots or channels through which the molten thermoplastic material 114a, 114b may be extruded. The first extruder 104 may communicate with the outer ring 117b while the second extruder 106 may communicate with the inner ring 117a. Thus, each of the rings may receive a different thermoplastic material 114a, 114b.

Referring to FIG. 7, air or gas may be delivered to the die 108a via an air supply line 120. The gas may exit the die 108a via a gas hole 119 that may be disposed in the center of the first and second rings 117a, 117b, as illustrated in FIG. 8. The molten thermoplastic material 114a, 114b may be expanded around the captured air. The air volume and temperature may be regulated by the supply line 120 and the hole 119. The nip rollers 136 may pull the polymer film upwards.

As shown by FIG. 7 the first thermoplastic film 114a can exit the die 108a as a first molten layer 138. Similarly, the second thermoplastic film 114b can exit the die 108b as a second molten layer 140 that is separate and not bonded to the first layer 138. At some point after exiting the die 108a, the first and second layers 138, 140 can be brought together before one or more of the layers 138, 140 is fully solidified. Thus, as shown by FIGS. 7 and 8, the dual-ring die 108a can form the first thermoplastic layer 138 into a first tubular stock and form the second thermoplastic layer 140 into a second tubular stock inside of the first tubular stock. Furthermore, in order to form a melt bond between the layers 138, 140 the second tubular stock can be caused to abut against the first tubular stock.

In words, the first at least partially molten or fully molten material 114a can be brought into contact with the second at least partially molten or fully molten material 114b after each have exited the die 108a. In one or more embodiments, the first and second materials 114a, 114b may not mix together except at the interface of the layer of the first material 114a and the layer of the second material 114b. In one or more embodiments, the first at least partially molten or fully molten material 114a can be brought into contact with the second at least partially molten or fully molten material 114b before the frost line area 130. As shown by FIG. 7, the frost line area 130 can be before the nip rollers 138. In alternative embodiments, the frost line area 130 (i.e., the point at which the layers 138, 140 become fully solidified can be after the rollers 136 such that the layers 138, 140 are brought together by the rollers 136 while at least one of the layers 138, 140 is still at least partially molten.

In order to control the strength of the melt-bond between the layers 138, 140 the manufacturer can control the temperature of the air from the air-ring 126 and/or air outlet 120, the position at which the layers 138, 140 are brought together (and in turn how molten each of the layers 138, 140 are before they are brought together. Thus, the manufacturer can use these operating parameters to ensure that the melt-bond between the layers 138, 140 has a desired strength. Thus, the manufacturer can use one or more operating parameters to ensure that the bond strength is such that forces acting on the melt-bonded film are first absorbed by breaking the bond between layers rather than, or prior to, tearing or otherwise causing the failure of the layers of the melt-bonded film.

The two extruders and dual-ringed die may facilitate forming a melt-bonded thermoplastic 134, 134a, 134b having multiple layers with a tailored bond strength. For example, the thermoplastic material 114a directed from the first extruder 104 to the outer ring 117b of the die 108a may form the outer layer 138 of the extruded tube 124 and the thermoplastic material 114b directed from the second extruder 106 to the inner ring 117a may form an inner layer 140 that may be adjacent and laminated to the outer layer. Thus, a two layer thermoplastic web may be produced. Additionally, when the extruded tube 124 is flattened by the rollers 136 positioned above the die 108a, the sides of the tube may also laminate together to form a four-layered web. In other embodiments, the dies and layering steps may be altered and modified to produce webs having any various numbers of possible layers. For example, in other embodiments, the web may have three, five, six, seven, eight, or more layers.

The melt-bonded films 134, 134a, 134b were tested and measured for dart drop resistance and slow puncture strength. The melt-bonded films 134, 134a, 134b were tested and measured for tear strength, and ultimate tensile strength, in the machine direction (MD) and in the transverse direction (TD). The melt-bonded films 134, 134a, 134b were tested and measured according to ASTM D882-02 for tensile strength testing, ASTM D1922 for tear resistance testing, ASTM D1709 A for dart drop testing, and ASTM F1306 for slow puncture testing, herein incorporated by reference in their entirety.

The melt-bonded films 134, 134a, 134b demonstrated a 62% increase in tear resistance along the traverse direction compared to the single layer web. The melt-bonded films 134, 134a, 134b demonstrated a 74% increase in ultimate tensile strength along the machine direction compared to the single layer web, while the ultimate tensile strength in the traverse direction remained consistent. The melt-bonded films 134, 134a, 134b demonstrated a 29% increase in dart drop resistance compared to the single layer web. The melt-bonded films 134, 134a, 134b also demonstrated a 44% increase in slow puncture strength compared to the single layer web. The melt-bonded films 134, 134a, 134b also demonstrated a 14% increase in elongation during the slow puncture test compared to the single layer web.

One will appreciate in light of the disclosure herein that the melt-bonded films 134, 134a, 134b can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include melt-bonded films 134, 134a, 134b to one extent or another. Trash bags and food storage bags may be particularly benefited by the films and methods of the present invention.

Figure 9:
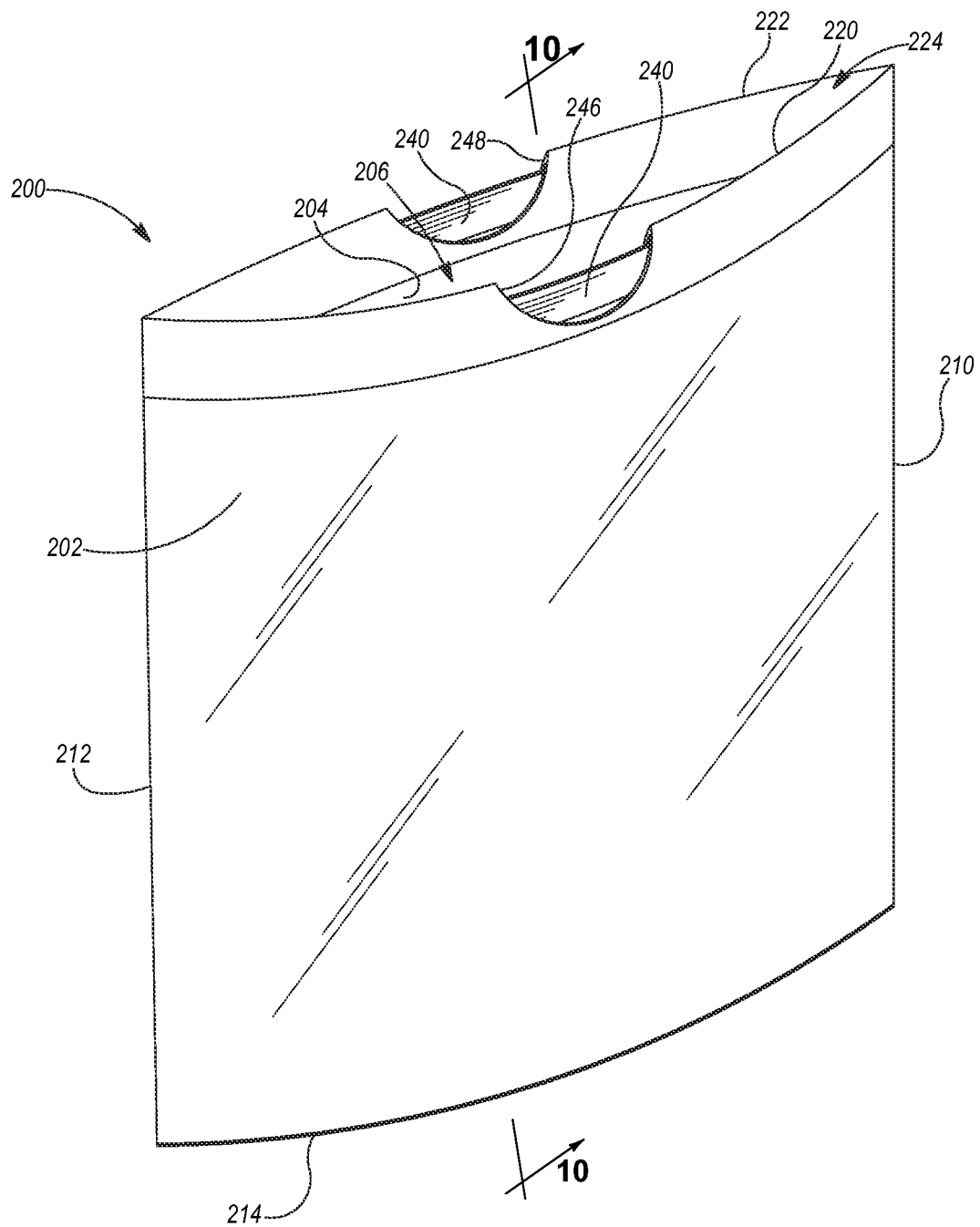
FIG. 9 illustrates a perspective view of a thermoplastic bag formed from a melt-bonded film in accordance with one or more implementations of the present invention.
Figure 10:
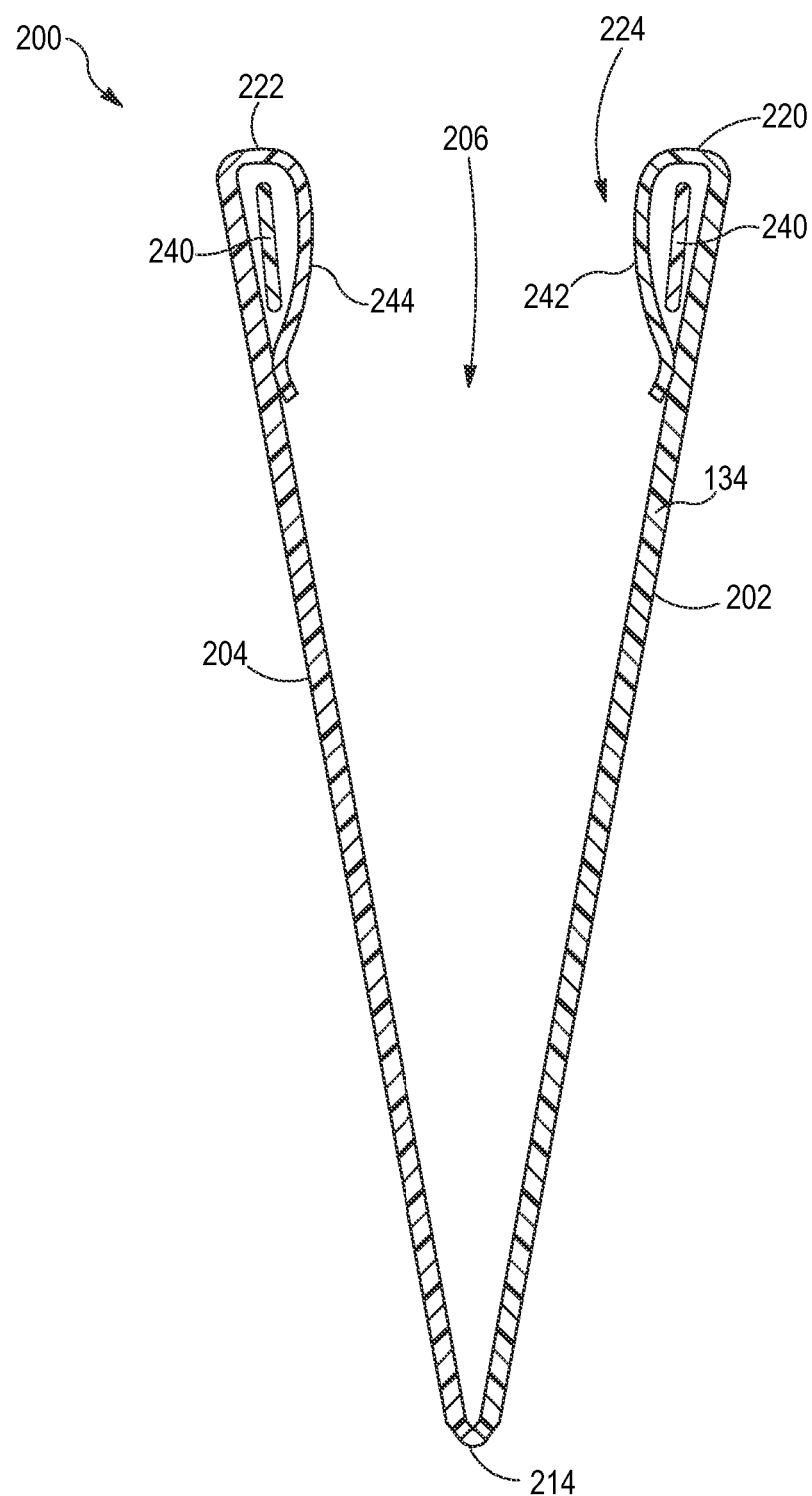
FIG. 10 illustrates a cross-sectional view of the bag of FIG. 9 taken along the line 10-10 of FIG. 9.

FIGS. 9 and 10 illustrate an implementation of a thermoplastic bag 200 formed from a melt-bonded film 134, 134a, 134b. The thermoplastic bag 200 may be used as a liner for a garbage can or similar refuse container. The thermoplastic bag 200 can include a first thermoplastic sidewall 202 and an opposing second thermoplastic sidewall 204 overlying the first thermoplastic sidewall 202 to provide an interior volume 206. The first and second thermoplastic sidewalls 202, 204 may be joined along a first side edge 210, an opposing second side edge 212, and a bottom edge 214. The bottom edge 214 may extend between the first and second side edges 210, 212. First and second top edges 220, 222 of the first and second thermoplastic sidewalls 202, 204 may be un-joined or unattached. In one or more implementations the thermoplastic sidewalls 202, 204 are joined along the first and second side edges 210, 212 and along the bottom edge 214 by any suitable process, such as heat sealing. In alternative implementations, the bottom edge 214, or one or more of the side edges 210, 212 can comprise a fold.

At least a portion of the first and second top edges 220, 222 of the respective first and second sidewalls 202, 204 may remain un-joined to define an opening 224 located opposite the bottom edge 214. The opening 224 may be used to deposit items into the interior volume 206. Furthermore, the thermoplastic bag 200 may be placed into a trash receptacle. When placed in a trash receptacle, the first and second top edges 220, 222 of the respective first and second sidewalls 202, 204 may be folded over the rim of the receptacle.

As shown in FIG. 10, each of the sidewalls 202, 204. In alternative implementations, one or more of the first sidewall 202 and the second sidewall 204 can be rough or uneven. Further, the gauge of one or more of the first sidewall 202 and the second sidewall 204 need not be consistent or uniform. Thus, the gauge of one or more of the first sidewall 202 and the second sidewall 204 can vary due to product design, manufacturing defects, tolerances, or other processing issues.

The thermoplastic bag 200 may have a height measured from the closed bottom edge 214 to the opening 224. The height may have a first range of about 20 inches (50.8 cm) to about 48 inches (121.9 cm), a second range of about 23 inches (58.4 cm) to about 33 inches (83.8 cm), and a third range of about 26 inches (66 cm) to about 28 inches (71.1 cm). In one implementation, the height 138 may be 27.375 inches (69.5 cm). In alternative implementations, the height 138 may be shorter or longer than the examples listed above.

The thermoplastic bag 200 may have other features that facilitate its use as a liner for trash receptacles. For example, one or more implementation can include a draw tape 240 to close or reduce the opening 224. To accommodate the draw tape 240 the first top edge 220 of the first sidewall 202 may be folded back into the interior volume 206 and may be attached to the interior surface of the sidewall to form a first hem 242. Similarly, the second top edge 222 of the second sidewall 204 may be folded back into the interior volume and may be attached to the second sidewall 204 to form a second hem 244.

As shown by FIG. 10, in one or more implementations, the draw tape 240 extends loosely through the first and second hems 242, 244 along the first and second top edge 220, 222. To access the draw tape 240, first and second notches 246, 248 may be disposed through the respective first and second top edges 220, 222. Pulling the draw tape 240 through the notches 246, 248 will constrict the first and second top edge 220, 222 thereby closing or reducing the opening 224. The draw tape closure may be used with any of the implementations of a thermoplastic bag described herein.

The first sidewall 202 and the second sidewall 204 can each comprise a melt-bonded film 134, 134a, 134b. In particular, the first sidewall 202 and the second sidewall 204 can comprise any of the melt-bonded films 134, 134a, 134b described hereinabove, or combinations thereof. It has been found that thermoplastic films often exhibit strength characteristics that are approximately equal to the strength of the weakest layer. The MD and TD tear values of melt-bonded films 134, 134a, 134b in accordance with one or more implementations can exhibit significantly improved strength properties. In particular, the individual values for the Dynatup, MD tear resistance, and TD tear resistance properties in melt-bonded films 134, 134a, 134b of one or more implementations are unexpectedly higher than the sum of the individual layers. Thus, the melt-bonded films 134, 134a, 134b of the bag 200 can provide a synergistic effect.

More specifically, the TD tear resistance of the melt-bonded films 134, 134a, 134b can be greater than a sum of the TD tear resistance of the individual layers. Similarly, the MD tear resistance of the melt-bonded films 134, 134a, 134b can be greater than a sum of the MD tear resistance of the individual layers. Along related lines, the Dynatup peak load of the melt-bonded films 134, 134a, 134b can be greater than a sum of a Dynatup peak load of the individual layers. Thus, the melt-bonded films 134, 134a, 134b can provide a synergistic effect.

Delamination and separation of the layers 138, 140, 148, 160, 162, 163 of the melt-bonded films 134, 134a, 134b may allow the layers to move or slide with respect to each other. An advantage of allowing the layers 138, 140, 148, 160, 162, 163 to delaminate and partially separate from each other when such forces are applied to the bag 200 may be an increased resistance to tearing or puncture due to energy absorption of the delaminating layers. When an abrupt force is applied to the sidewall of the bag, delamination and separation of the layers 138, 140, 148, 160, 162, 163 may dissipate some of the applied force by, for instance, allowing the layers to move or slide with respect to each other. Thus, when the bag is used as a liner for a trash receptacle and objects are dropped into the interior volume, the bag may resist tearing and spilling of the contents.

Figure 11:
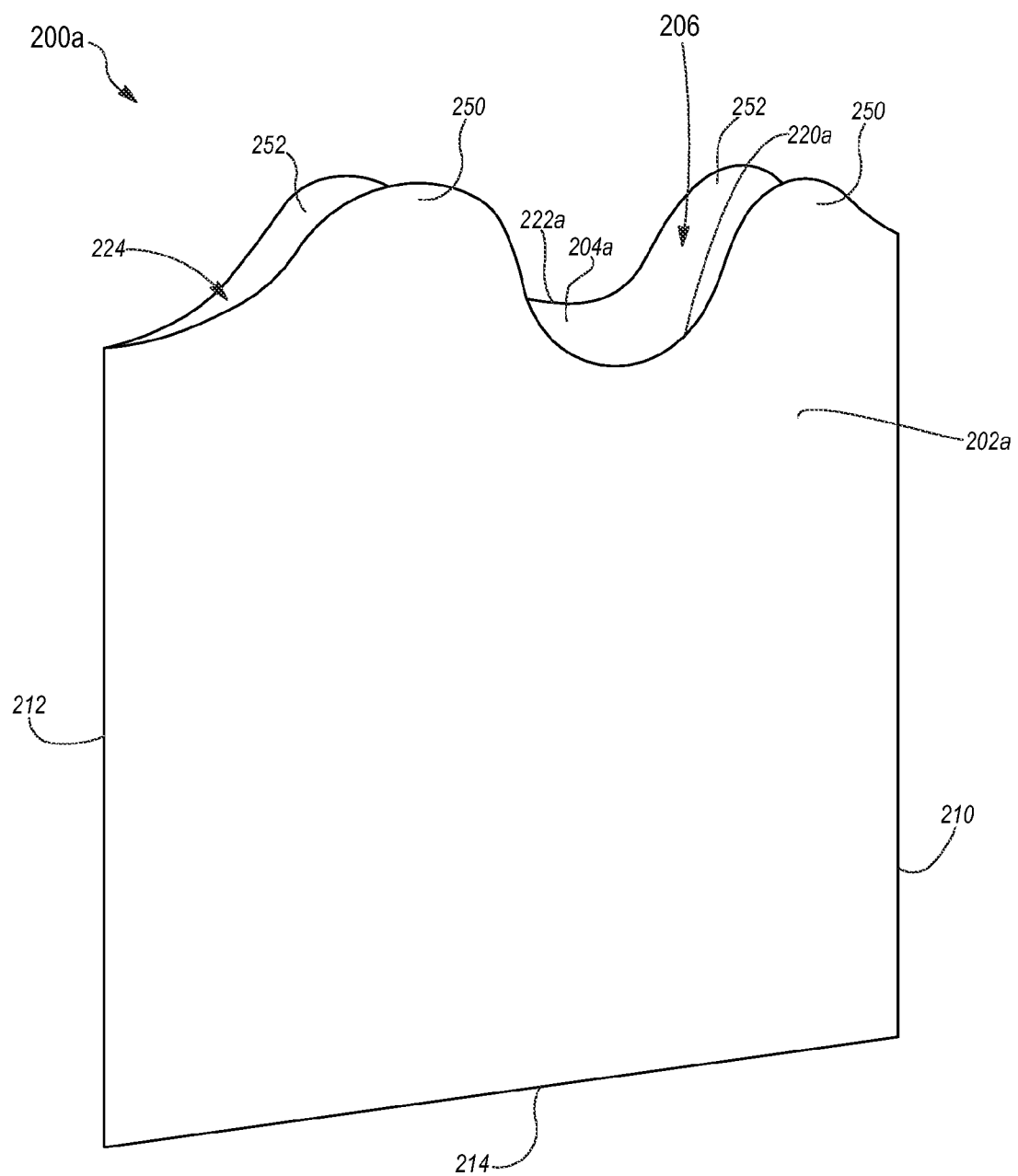
FIG. 11 illustrates a perspective view of another thermoplastic bag formed from a melt-bonded film in accordance with one or more implementations of the present invention.
Figure 12:
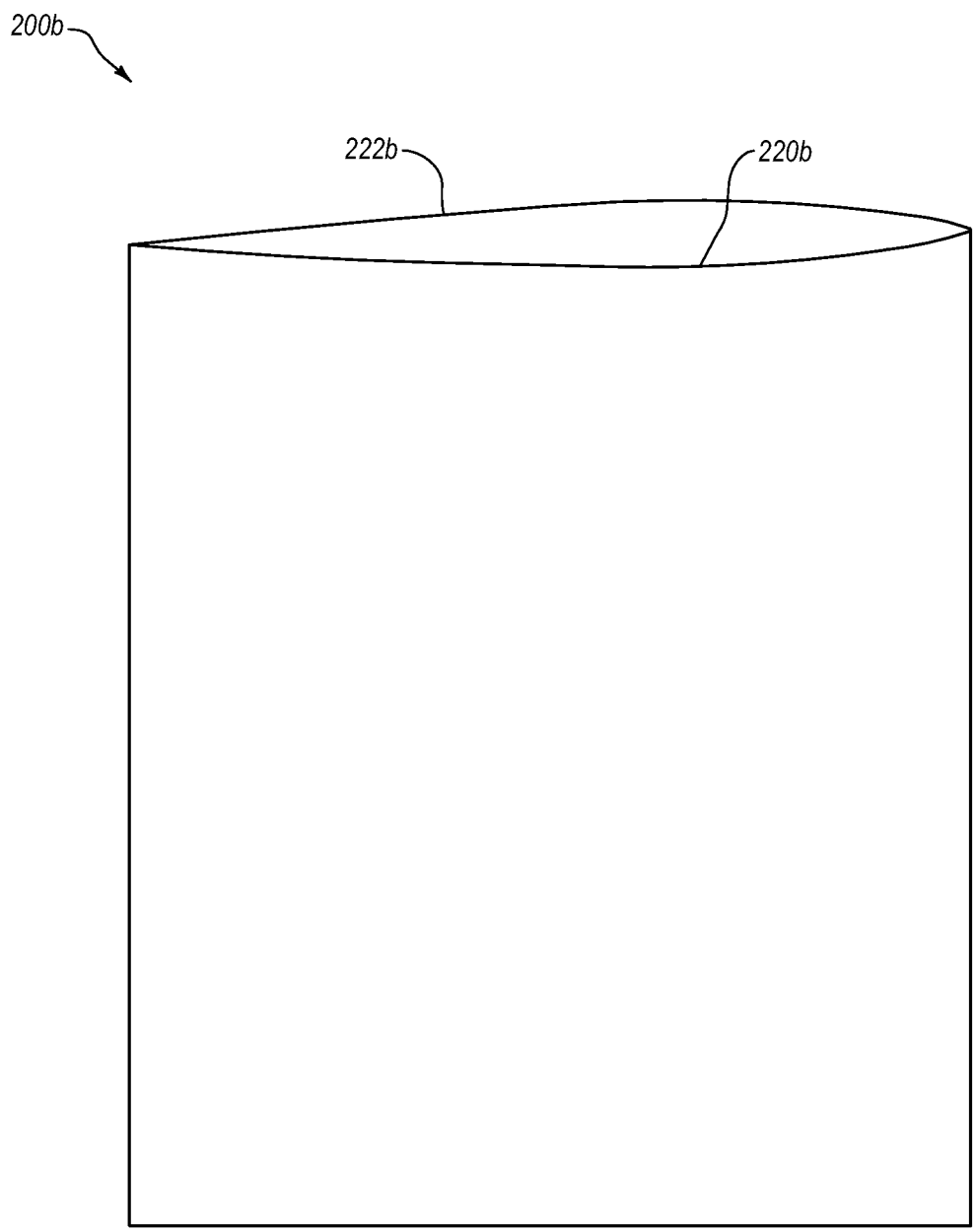
FIG. 12 illustrates a perspective view of yet another a thermoplastic bag formed from a melt-bonded film in accordance with one or more implementations of the present invention.

FIGS. 9-10 illustrate a bag 200 formed from a melt-bonded thermoplastic film 134, 134a, 134b including a draw tape as a closure mechanism. One will appreciate in light of the disclosure herein that the present invention is not so limited. In alternative implementations, the closure mechanism can comprise flaps, adhesive tapes, a tuck and fold closure, an interlocking closure, a slider closure, a zipper closure or other closure structures known to those skilled in the art for closing a bag. For example, FIG. 11 illustrates that the bag 200a formed from a melt-bonded thermoplastic film 134, 134a, 134b including flaps 250, 252 as a closure mechanism instead of a draw tape 240. The tie flaps 250, 252 may be tied together when the bag 200a is removed from the receptacle and disposed of. In addition to tie flaps and draw tapes, other suitable closing mechanisms include twist ties and mechanical clips. Referring to FIG. 12, there is illustrated another embodiment of a bag 200b made from melt-bonded thermoplastic film 134, 134a, 134b. The bag 200b may be similar to bag 200a except that the top edges 220b, 222b are relatively straight and may not include the flaps.

Additionally, one or more implementations include controlling or otherwise tailoring the melt bond between two layers of a melt-bonded film 134, 134a, 134b through post formation processing, such as cold deformation. For example, one or more implementations include ring rolling, performing a structural elastic like film process ("SELF-ing"), embossing, or preforming combinations thereof on a melt-bonded film 134, 134a, 134b to further tailor the strength of the bond between the layers. In particular, one or more implementations include tailoring a bond strength of a melt-bonded film 134, 134a, 134b by intermittingly separating the first layer 138 from the second layer 140 to form discontinuous melt bonds. One will appreciate that prior to deformation, a melt-bonded film 134, 134a, 134b can include a continuous melt-bond between layers (i.e., a bond that is co-extensive with the bonding surfaces such that the entire bonding surfaces are bonded together).

Figure 13A:
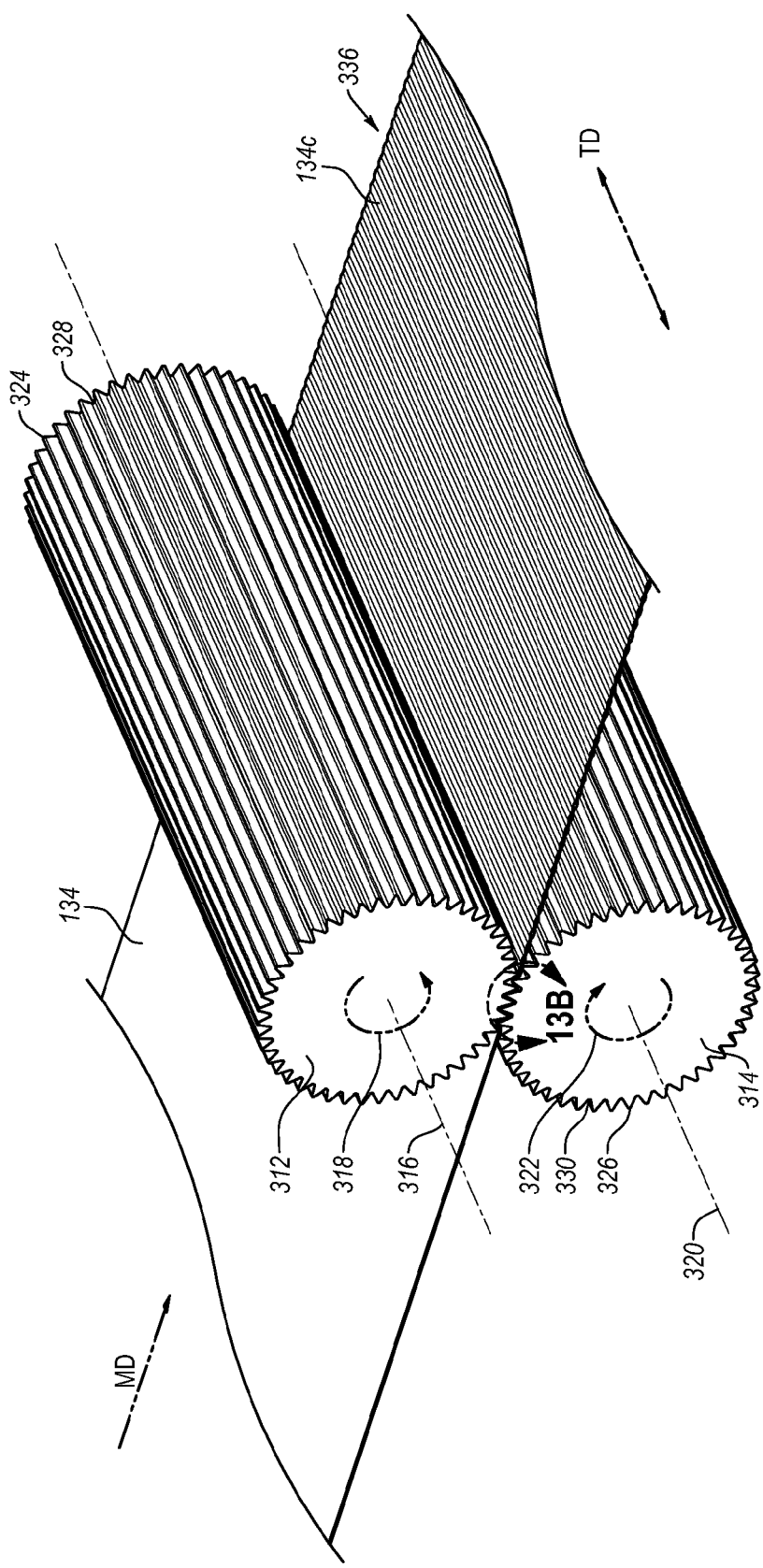
FIG. 13A illustrates a schematic diagram of a melt-bonded film being intermittingly separated by passing through a pair of machine-direction intermeshing rollers in accordance with one or more implementations of the present invention.
Figure 13B:
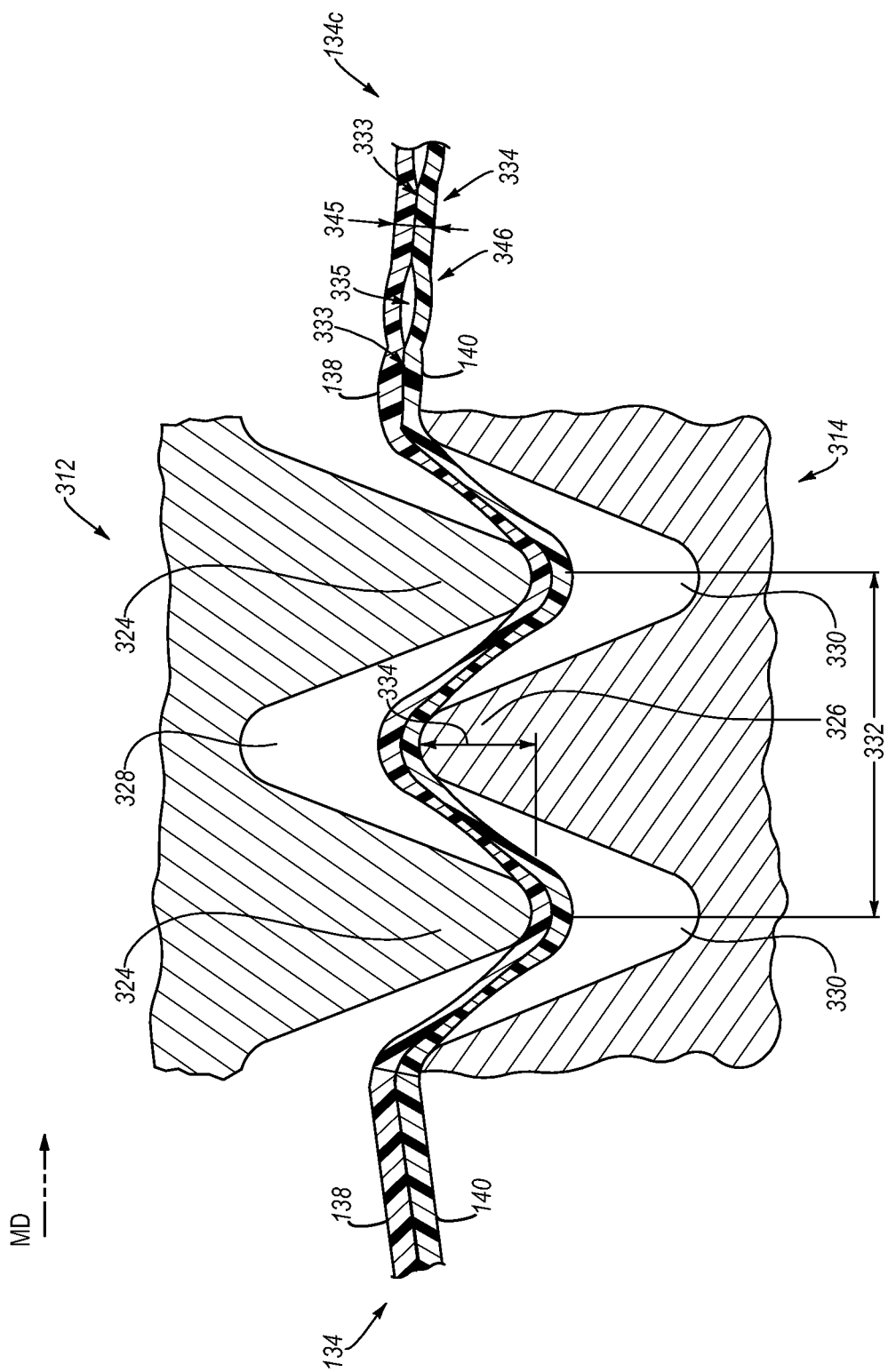
FIG. 13B illustrates an enlarged view of the melt-bonded film passing together through the intermeshing rollers of FIG. 13A taken along the circle 13B of FIG. 13A in accordance with one or more implementations of the present invention.

As previously mentioned, according to one implementation of the invention, the separate layers of the multi-layer film are non-continuously, lightly bonded to one another. FIGS. 13A-13B illustrate exemplary processes of partially discontinuously bonding adjacent layers of a multi-layer thermoplastic film in accordance with an implementation of the present invention. In particular, FIGS. 13A-13B illustrate an MD ring rolling process that tailors the strength of a melt bond 141, 159, 164, 165 between the individual adjacent layers 138, 140, 148, 160, 163 of a melt-bonded film 134 by passing the melt-bonded film 134 through a pair of MD intermeshing rollers 312, 314. As a result of MD ring rolling, the melt-bonded film 134 is also intermittently stretched in the machine direction MD.

As shown by the FIGS. 13A-13B, the first roller 312 and the second roller 314 can each have a generally cylindrical shape. The rollers 312, 314 may be made of cast and/or machined metal, such as, steel, aluminum, or any other suitable material. The rollers 312, 314 can rotate in opposite directions about parallel axes of rotation. For example, FIG. 13A illustrates that the first roller 312 can rotate about a first axis 316 of rotation in a counterclockwise direction 318. FIG. 13A also illustrates that the second roller 314 can rotate about a second axis 320 of rotation in a clockwise direction 322. The axes of rotation 316, 320 can be parallel to the transverse direction TD and perpendicular to the machine direction MD.

The intermeshing rollers 312, 314 can closely resemble fine pitch spur gears. In particular, the rollers 312, 314 can include a plurality of protruding ridges 324, 326. The ridges 324, 326 can extend along the rollers 312, 314 in a direction generally parallel to axes of rotation 316, 320. Furthermore, the ridges 324, 326 can extend generally radially outward from the axes of rotation 316, 320. The tips of ridges 324, 326 can have a variety of different shapes and configurations. For example, the tips of the ridges 324, 326 can have a rounded shape as shown in FIG. 13B. In alternative implementations, the tips of the ridges 324, 326 can have sharp angled corners. FIGS. 13A-13B also illustrate that grooves 328, 330 can separate adjacent ridges 324, 326.

The ridges 324 on the first roller 312 can be offset or staggered with respect to the ridges 326 on the second roller 314. Thus, the grooves 328 of the first roller 312 can receive the ridges 326 of the second roller 314, as the rollers 312, 314 intermesh. Similarly, the grooves 330 of the second roller 314 can receive the ridges 324 of the first roller 312.

One will appreciate in light of the disclosure herein that the configuration of the ridges 324, 326 and grooves 328, 330 can prevent contact between ridges 324, 326 during intermeshing so that no rotational torque is transmitted during operation. Additionally, the configuration of the ridges 324, 326 and grooves 328, 330 can affect the amount of stretching and the bond strength resulting from partially discontinuous lamination as the film passes through intermeshing rollers 312, 314.

Referring specifically to FIG. 13B, various features of the ridges 324, 326 and grooves 328, 330 are shown in greater detail. The pitch and depth of engagement of the ridges 324, 326 can determine, at least in part, the amount of incremental stretching and partially discontinuous lamination caused by the intermeshing rollers 312, 314. As shown by FIG. 13B, the pitch 332 is the distance between the tips of two adjacent ridges on the same roller. The "depth of engagement" ("DOE") 334 is the amount of overlap between ridges 324, 326 of the different rollers 312, 314 during intermeshing.

The ratio of DOE 334 to pitch 332 can determine, at least in part, the bond strength provided by the partially discontinuous bonding. According to one embodiment, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1. Thus, in one or more embodiments passing the melt-bonded film 134 through the MD ring rolls 312, 314 can stretch the melt-bonded film 134 between about 100 and 200 percent. More specifically, passing the melt-bonded film 134 through the MD ring rolls 312, 314 can stretch the melt-bonded film 134 at about 150 percent.

As shown by FIG. 13A, the direction of travel of the melt-bonded film 134 through the intermeshing rollers 312, 314 is parallel to the machine direction and perpendicular to the transverse direction. As the thermoplastic melt-bonded film 134 passes between the intermeshing rollers 312, 314, the ridges 324, 326 can incrementally stretch the melt-bonded film 134 in the machine direction. In one or more implementations, stretching the melt-bonded film 134 in the machine direction can reduce the gauge of the film and increase the length of the melt-bonded film 134. In other implementations, the melt-bonded film 134 may rebound after stretching such that the gauge of the melt-bonded film 134 is not decreased. Furthermore, in one or more implementations, stretching the film 134 in the machine direction can reduce the width of the melt-bonded film 134. For example, as the melt-bonded film 134 is lengthened in the machine direction, the film's length can be reduced in the transverse direction.

In particular, as the melt-bonded film 134 proceeds between the intermeshing rollers 312, 314, the ridges 324 of the first roller 312 can push the melt-bonded film 134 into the grooves 330 of the second roller 314 and vice versa. The pulling of the melt-bonded film 134 by the ridges 324, 326 can stretch the melt-bonded film 134. The rollers 312, 314 may not stretch the melt-bonded film 134 evenly along its length. Specifically, the rollers 312, 314 can stretch the portions of the melt-bonded film 134 between the ridges 324, 326 more than the portions of the melt-bonded film 134 that contact the ridges 324, 326. Thus, the rollers 312, 314 can impart or form a generally striped pattern 336 into the melt-bonded film 134. As used herein, the terms "impart" and "form" refer to the creation of a desired structure or geometry in a film upon stretching the film that will at least partially retain the desired structure or geometry when the film is no longer subject to any strains or externally applied forces.

FIGS. 13A-13B illustrate that the melt-bonded film 134 (i.e., the film that is yet to pass through the intermeshing rollers 312, 314) can have a substantially flat top surface and substantially flat bottom surface. As seen in FIG. 13B, the multi-layer melt-bonded film 134 may comprise two layers 138 and 140 that are continuously melt-bonded together. The melt-bonded film 134 can have an initial thickness or starting gauge (i.e., the sum of gauges 142 and 144) extending between its major surfaces (i.e., the top surface and the bottom surface). In at least one implementation, the starting gauge 146, as well as the gauge 142, 144 of individual layers 138 and 140 can be substantially uniform along the length of the multi-layer melt-bonded film 134. The process of passing the melt-bonded film 134 can break the melt bond 141 between the layers 138, 140 layers as they are pulled through and stretched by intermeshing rollers 312, 314. Thus, the passing the melt-bonded film 134 through the MD ring rolls 312, 314 can further adjust or tailor the melt bond 141 by modifying the melt bond 141.

In one or more implementations, the melt-bonded film 134 need not have an entirely flat top surface, but may be rough or uneven. Similarly, bottom surface or the inner oriented surfaces of layers 138 and 140 of the melt-bonded film 134 can also be rough or uneven. Further, the starting gauge need not be consistent or uniform throughout the entirety of the melt-bonded film 134. Thus, the starting gauge 42 can vary due to product design, manufacturing defects, tolerances, or other processing issues. According to one embodiment, the individual layers 138 and 140 may be pre-stretched (e.g., through MD ring rolling, TD ring rolling, etc.) before being positioned adjacent to the other layer (140 or 138, respectively). Such pre-stretching of individual layers can result in a striped surface exhibiting an uneven top and bottom surface similar to that seen in FIG. 13A.

As seen in FIG. 13A, upon stretching and partially discontinuous lamination of the adjacent layers, the MD incrementally stretched melt-bonded film 134b can include a striped pattern 336. The striped pattern 336 can include alternating series of thinner regions 346 and thicker regions 344. The thinner regions 346 can correspond to weakened areas 335 in which the melt bond 141 is weaker than in strengthened areas 333. The gauge of the layers 138, 140 in the thinner regions 346 can be less than the combined gauge of the layers 138, 140 prior to passing through the rollers 312, 314. The total gauge (layers 138, 140 and any space 335 between the layers 138, 140) of the thinner regions 346 may be greater than combined gauge of the layers 138, 140 prior to passing through the rollers 312, 314 in one or more embodiments. The thinner regions 344 can correspond to strengthened areas 333 in which the melt bond 141 is greater than in weakened areas 335. The gauge of the layers 138, 140 in the thinner regions 344 can be as much or less than the combined gauge of the layers 138, 140 prior to passing through the rollers 312, 314.

Thus, the MD incrementally stretched melt-bonded film 134b can include areas with different melt bond strengths. FIG. 13B illustrates that weakened areas 335 are areas in which the melt bond 141 has been completely broken and the layers 138, 140 are separated. In the embodiment shown in FIG. 13B, the strengthened areas 333 retain a melt bond 141 between the layers 138, 140. In such embodiments, the strengthened areas 333 can have a melt bond that is strengthened due to the compression provided by the teeth 324. One will appreciate that the terms "strengthened areas" and "weakened areas" refer to the melt bond between the layers of the melt-bonded film 134b. Furthermore, the terms "strengthened areas" and "weakened areas" are relative to each other and not necessarily relative to the strength of the melt bond 141 between the layers 138, 140 prior to passing through MD ring rolls 312, 314. In other words, the strengthened areas 333 have a melt bond that is stronger than any melt bond in the weakened areas 335, but not necessarily stronger than the strength of the melt bond 141 between the layers 138, 140 prior to passing through MD ring rolls 312, 314. In one or more embodiments, the melt bond in the strengthened areas 333 is stronger than the strength of the melt bond 141 between the layers 138, 140 prior to passing through MD ring rolls 312, 314.

Along related lines, the weakened areas 335 have a melt bond that is weaker or less than the melt bond in the strengthened regions 333, but not necessarily weaker than the strength of the melt bond 141 between the layers 138, 140 prior to passing through MD ring rolls 312, 314. In one or more embodiments, the melt bond in the weakened areas 335 is weaker than the strength of the melt bond 141 between the layers 138, 140 prior to passing through MD ring rolls 312, 314.

In any event, FIGS. 13A-13B illustrate that intermeshing rollers 312, 314 can process the melt-bonded film 134 into an incrementally-stretched melt-bonded film 134b. As previously mentioned, the MD incrementally-stretched melt-bonded film 134b can include a striped pattern 336 where the thicker regions 344 and the thinner regions 346 are oriented along a continuous line or region along the width of the film 134b, parallel to the TD direction. The striped pattern 336 can include alternating series of thicker regions 344 and the thinner regions 346 (and thus strengthened and weakened regions 333, 335). Although the thicker regions 344 of the incrementally-stretched melt-bonded film 134b may be stretched to a small degree by rollers 312, 314 (or stretched in a separate operation), the thicker regions 344 may be stretched significantly less compared to the thinner regions 346.

Figure 14:
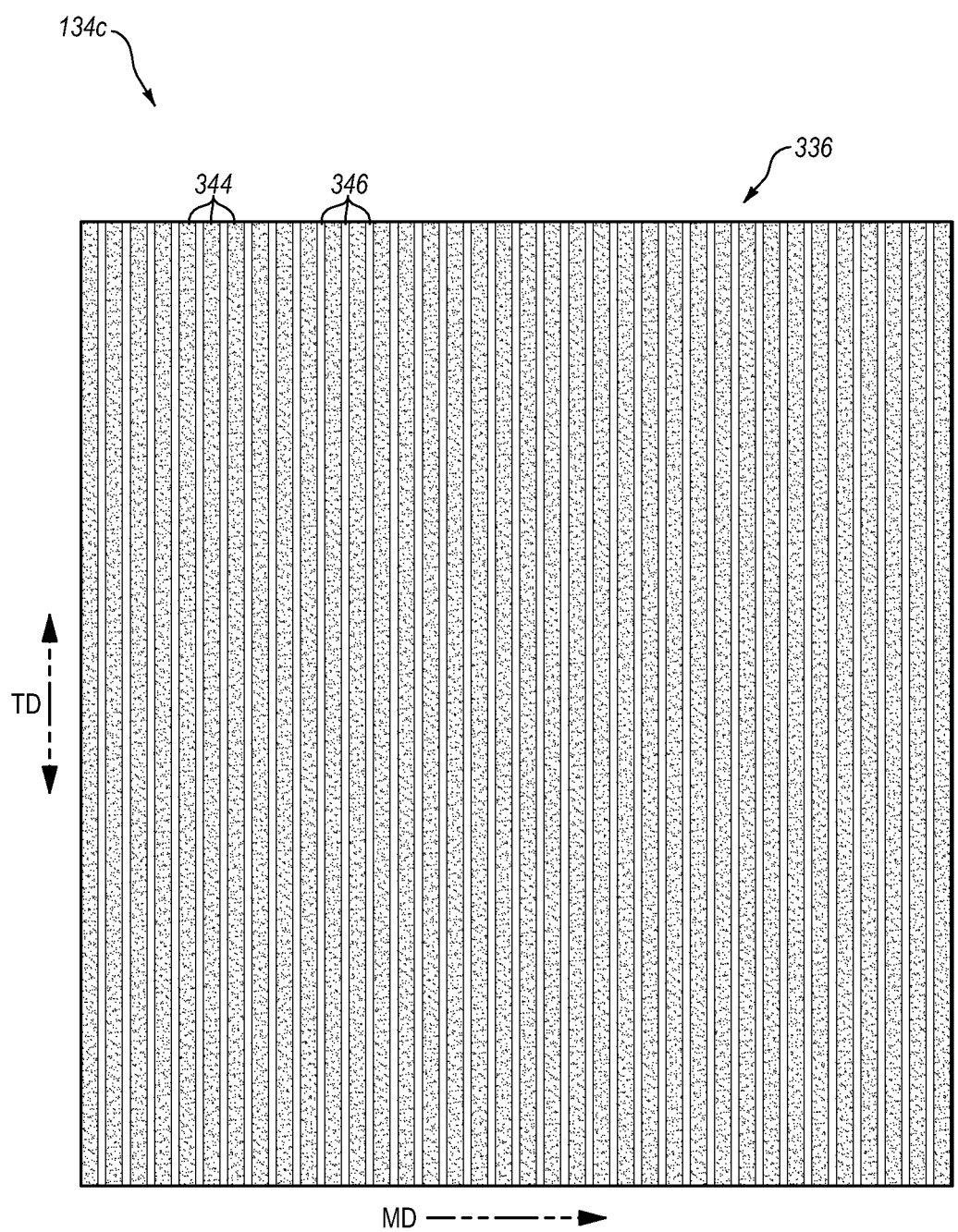
FIG. 14 illustrates a view of a film with intermittent melt-bonds created by passing a melt-bonded film through the intermeshing rollers of FIG. 13A in accordance with one or more implementations of the present invention.

FIG. 14 illustrates a top view of the MD incrementally-stretched melt-bonded film 134b. As shown by FIG. 14, the film 134b includes thinner regions 346 adjacent to thicker regions 344. The thinner regions 346 and thicker regions 344 can extend across the film 134b in a direction transverse (i.e., transverse direction) to a direction in which the film was extruded (i.e., machine direction). As shown by FIG. 14, the thinner regions 346 and thicker regions 344 can extend across the entire length of the film 134b. One will appreciate in light of the disclosure herein that the striped pattern 336 may vary depending on the method used to incrementally stretch the melt-bonded film 134. To the extent that MD or other ring rolling is used to modify the melt bond, the striped pattern 336 (e.g., width and spacing of the stripes or thinner regions 346) on the melt-bonded film 134 can depend on the pitch 332 of the ridges 324, 326, the DOE 334, and other factors. As thinner regions 346 represent areas of the incrementally-stretched melt-bonded film 134b in which the melt bond of adjacent layers 138, 140 may be weakened, it will be apparent that altering the spacing and/or width of regions 346 can affect the overall strength of the film.

FIG. 14 further illustrates that the thinner regions 346 can be intermittently dispersed about thicker regions 344. In particular, each thinner region 346 can reside between adjacent thicker regions 344. Additionally, the thinner regions 346 can be visually distinct from the thicker regions 344 as a result of stretching. In one or more implementations, the molecular structure of the thermoplastic material of the incrementally-stretched melt-bonded film 134b may be rearranged during stretching (e.g., particularly so during cold stretching).

MD ring rolling is one exemplary method of tailoring a melt bond between adjacent layers 138, 140 of a melt-bonded film 134. TD ring rolling is another suitable method of tailoring a melt bond between adjacent layers 138, 140 of a melt-bonded film 134. For example, FIGS. 15A-15D illustrate a TD ring rolling process that tailoring a melt bond between adjacent layers 138, 140 of a melt-bonded film 134 by passing the melt-bonded film 134 through a pair of TD intermeshing rollers 352, 354.

A TD ring rolling process (and associated TD intermeshing rollers 352, 354) can be similar to the MD ring rolling process (and associated MD intermeshing rollers 312, 314) described herein above, except that the ridges 356, 358 and grooves 360, 362 of the TD intermeshing rollers 352, 354 extend generally orthogonally to the axes of rotation 316, 320 (i.e., parallel to the MD direction). Thus, as shown by FIGS. 15A-15D, as the thermoplastic melt-bonded film 134 passes between the intermeshing rollers 352, 354, the ridges 356, 358 can incrementally stretch and modify the strength of the melt bond of the melt-bonded film 134. The resultant TD incrementally-stretched melt-bonded film 134d can include a striped pattern 336a formed by thicker regions 344a and alternating thinner regions 346a.

The thinner regions 346a can correspond to weakened areas 335a in which the melt bond 141 is weaker than in strengthened areas 333a. The gauge of the layers 138, 140 in the thinner regions 346a can be less than the combined gauge of the layers 138, 140 prior to passing through the rollers 352, 354. The total gauge (layers 138, 140 and any space 335a between the layers 138, 140) of the thinner regions 346a may be greater than combined gauge of the layers 138, 140 prior to passing through the rollers 352, 354 in one or more embodiments. The thinner regions 344a can correspond to strengthened areas 333a in which the melt bond 141 is greater than in weakened areas 335a. The gauge of the layers 138, 140 in the thinner regions 344a can be as much or less than the combined gauge of the layers 138, 140 prior to passing through the rollers 312, 314.

Figure 15A:
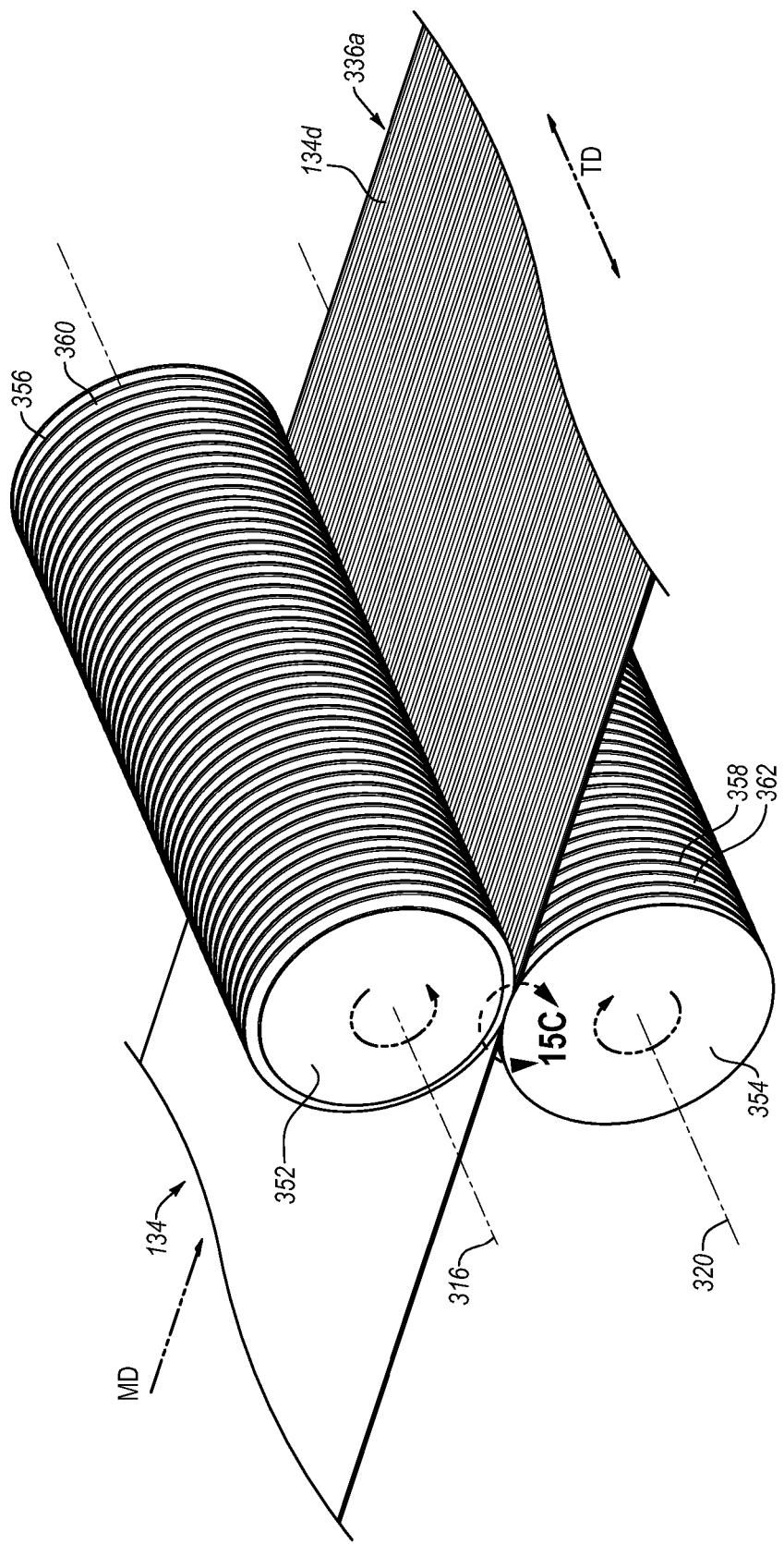
FIG. 15A illustrates a schematic diagram of a melt-bonded film being intermittingly separated by passing through a pair of transverse-direction intermeshing rollers in accordance with one or more implementations of the present invention.
Figure 15D:
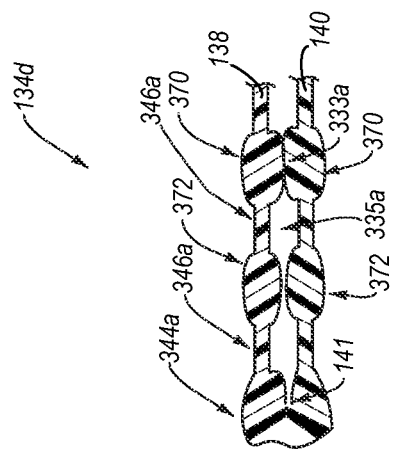
FIG. 15D illustrates an enlarged view of the melt-bonded film after passing through the intermeshing rollers of FIG. 15A.
Figure 15C:
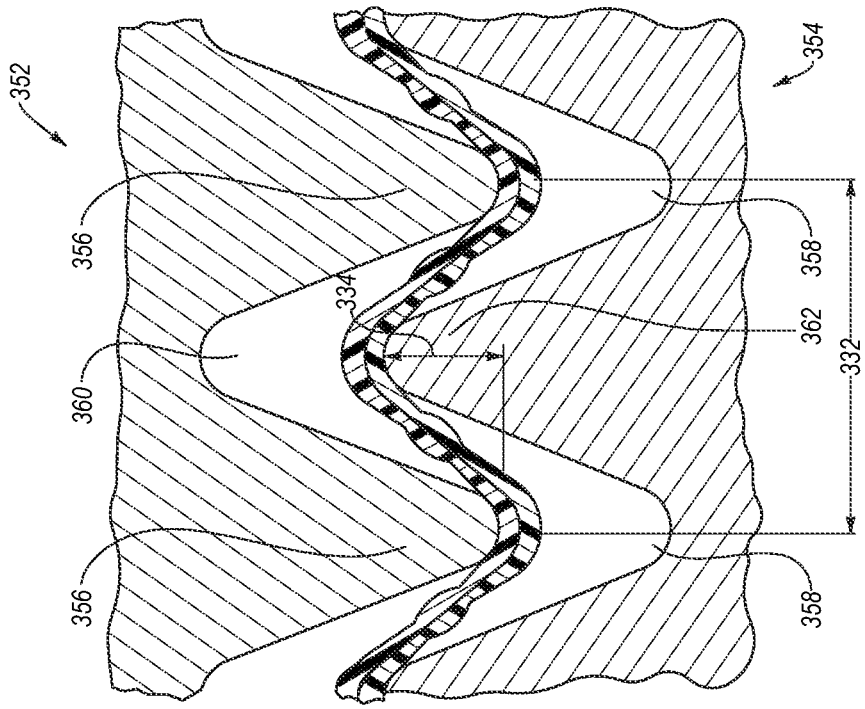
FIG. 15C illustrates an enlarged view of the melt-bonded film passing through the intermeshing rollers of FIG. 15A taken along the circle 15C of FIG. 15A.
Figure 15B:
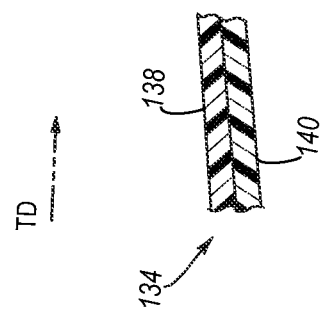
FIG. 15B illustrates an enlarged view of the melt-bonded film prior to passing through the intermeshing rollers of FIG. 15A.

FIG. 15D further illustrates that in one or more embodiments not each thicker region 344a may include a melt bond 141. In particular, some thicker regions 344a can include thicker portions 372 of film that are not bonded and other thicker regions 344a can include thicker portions 370 that are melt-bonded together.

Figure 16:
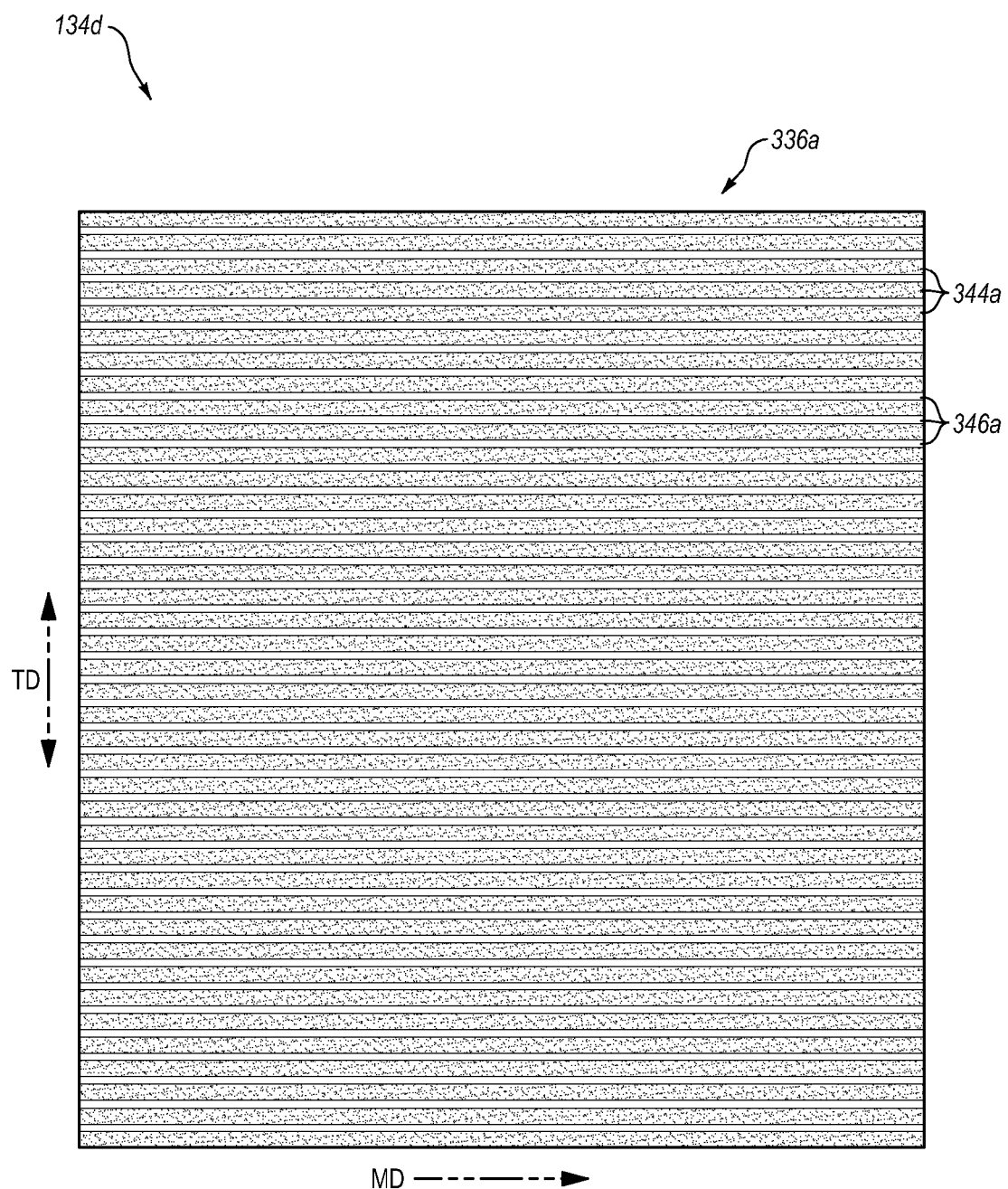
FIG. 16 illustrates a view of a film with intermittent melt-bonds created by passing a melt-bonded film through the intermeshing rollers of FIG. 15A in accordance with one or more implementations of the present invention.

FIG. 16 illustrates a view of the TD incrementally-stretched melt-bonded film 134d with thinner regions 346a and adjacent thicker regions 344a. The striped pattern 336a can include alternating series of thicker regions 344a and thinner regions 346a. FIG. 16 illustrates that the thinner regions 346a extend across the TD incrementally-stretched melt-bonded film 134d in the machine direction. As shown by FIG. 16, the thinner regions 346a can extend across the entire width of the TD incrementally-stretched melt-bonded film 134d. In alternative implementations, thinner regions 346a can extend across only a portion of the TD incrementally-stretched melt-bonded film 134d. Similar to MD ring rolling, the pitch and the DOE of the ridges 356, 358 of the intermeshing rollers 352, 354 can affect the width and spacing of the thinner regions 346a, as well as the strength of the melt bonds.

Figure 17:
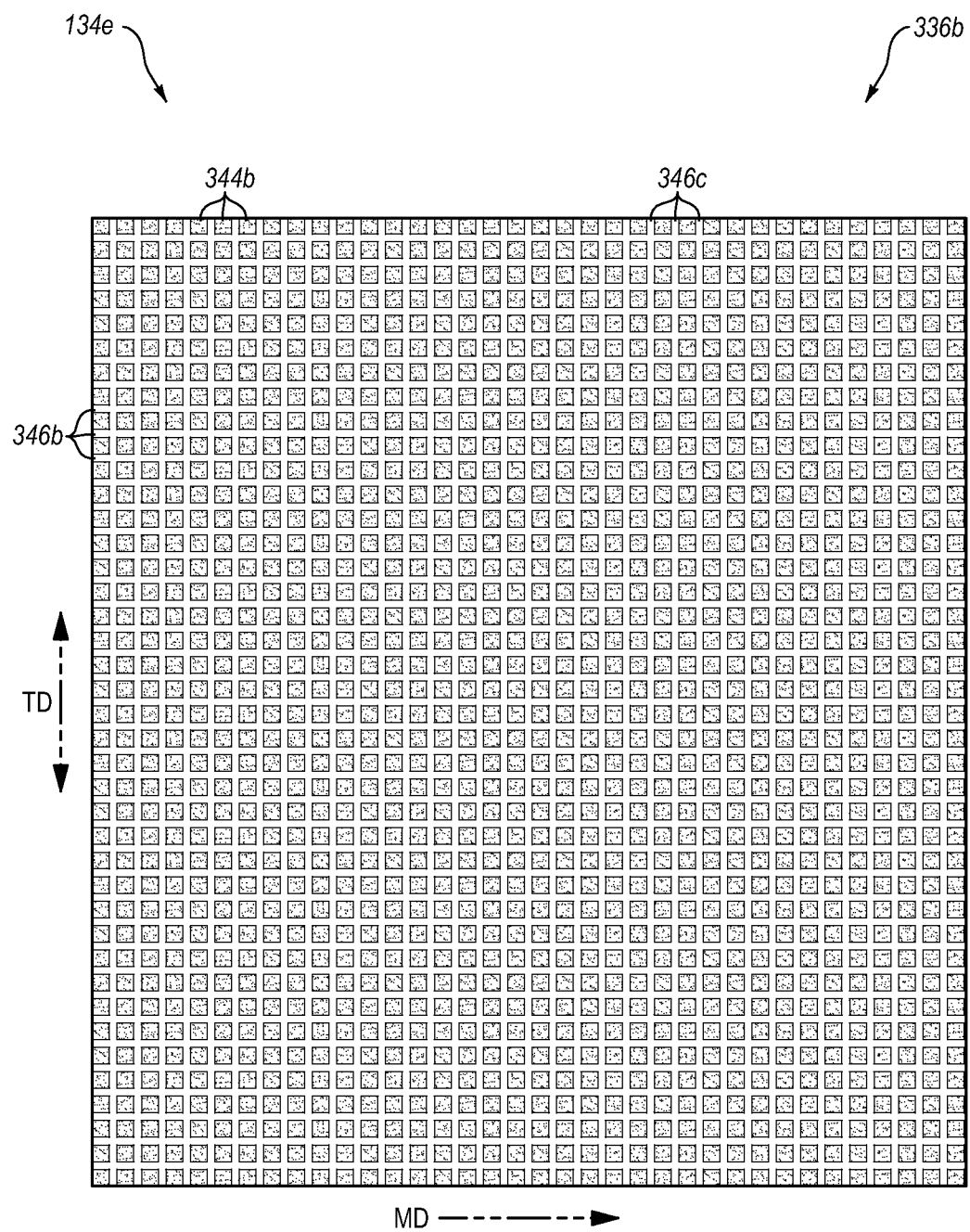
FIG. 17 illustrates a view of a film with intermittent melt-bonds created by passing a melt-bonded film through the intermeshing rollers of FIGS. 13A and 15A in accordance with one or more implementations of the present invention.

In still further implementations, a melt-bonded film 134 can undergo both an MD ring rolling process and a TD ring rolling process to tailor the melt bond between the layers. For example, FIG. 17 illustrates a top view of an incrementally-stretched melt-bonded film 134e created by MD and TD ring rolling. The incrementally-stretched melt-bonded film 134e can have a grid pattern 336b including alternating series of thicker regions 344b and thinner regions 346b, 346c. In particular, thicker regions 344b may comprise a plurality of discrete squares or rectangles while the remainder of the surface comprises a grid of horizontal and vertical bonded regions that are connected together. The thinner regions 346b, 346c that extend along the incrementally-stretched melt-bonded film 134e in the machine direction, and thinner regions 346c that extend along the film in the transverse direction can cross each other. As shown by FIG. 17, in one or more implementations, the aspect ratio of the rows and columns of the thinner regions 346b, 346c can be approximately 1 to 1. In alternative implementations, the aspect ratio of the rows and columns of thinner regions 346b, 346c can be greater or less than 1 to 1.

The incrementally-stretched melt-bonded film 134e can allow for greater material savings by further increasing the surface area of a given portion of film, by increasing the density of thinner regions 346, and may also provide properties or advantages not obtained by MD or TD ring rolling alone.

In yet further implementations, a manufacturer can use DD ring rolling to lightly bond a thermoplastic film. DD ring rolling processes (and associated DD intermeshing rollers) can be similar to the MD ring rolling process (and associated MD intermeshing rollers 312, 314) described herein above, except that the ridges and grooves of the DD intermeshing rollers can extend at an angle relative to the axes of rotation.

In accordance with another implementation, a structural elastic like film (SELF) process may be used to create a thermoplastic film with strainable networks, which similarly results in tailored melt bonds. As explained in greater detail below, the strainable networks can include adjacent bonded and un-bonded regions. U.S. Pat. Nos. 5,518,801; 6,139,185; 6,150,647; 6,394,651; 6,394,6352; 6,513,975; 6,695,476; U.S. Patent Application Publication No. 2004/0134923; and U.S. Patent Application Publication No. 2006/0093766 each disclose processes for forming strainable networks or patterns of strainable networks suitable for use with implementations of the present invention. The contents of each of the aforementioned patents and publications are incorporated in their entirety by reference herein.

Figure 18:
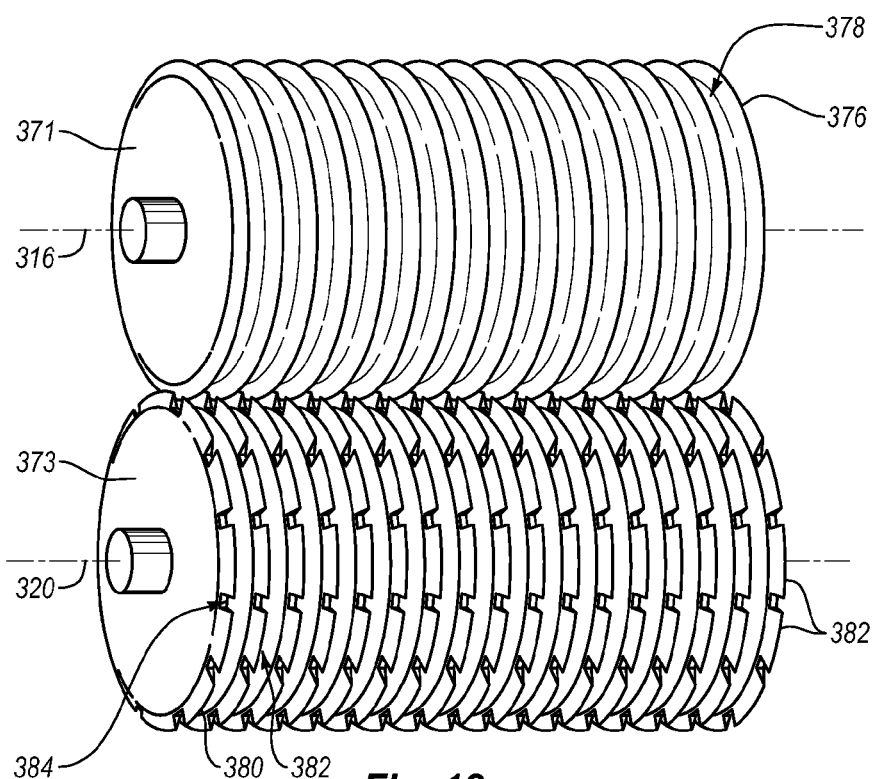
FIG. 18 illustrates a schematic diagram of a set of intermeshing rollers used to form a structural elastic like film (SELF) by imparting strainable networks into the film while also modifying a melt bond between layers of a melt-bonded film in accordance with one or more implementations of the present invention.

FIG. 18 illustrates a pair of SELF'ing intermeshing rollers 371, 373 for creating strainable networks with lightly bonded regions in a film. The first SELF'ing intermeshing roller 371 can include a plurality of ridges 376 and grooves 378 extending generally radially outward in a direction orthogonal to an axis of rotation 316. Thus, the first SELF'ing intermeshing roller 371 can be similar to a TD intermeshing roller 352, 354. The second SELF'ing intermeshing roller 373 can include also include a plurality of ridges 380 and grooves 382 extending generally radially outward in a direction orthogonal to an axis of rotation 320. As shown by FIG. 18, however, the ridges 380 of the second SELF'ing intermeshing roller 373 can include a plurality of notches 384 that define a plurality of spaced teeth 386.

Figure 19:
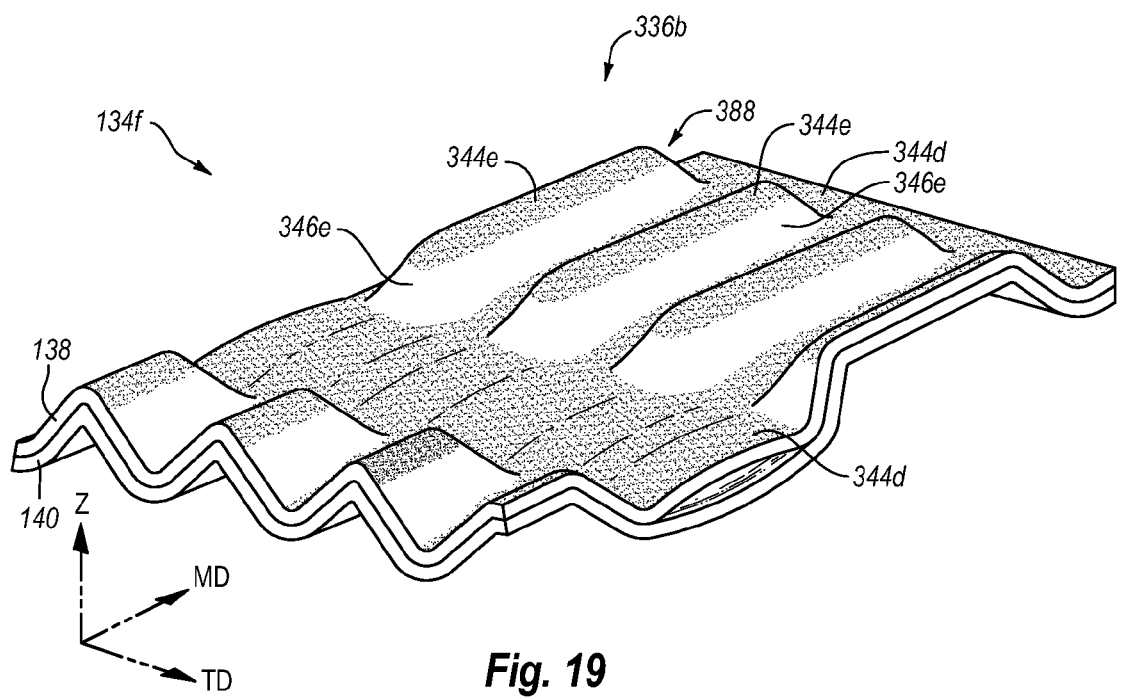
FIG. 19 illustrates a view of a melt-bonded thermoplastic film with a strainable network created by passing a melt-bonded film through the intermeshing rollers of FIG. 18.

Referring now to FIG. 19, a melt-bonded film 134f created using the SELF'ing intermeshing rollers 371, 373 is shown. In particular, as the film passes through the SELF'ing intermeshing rollers 371, 373, the teeth 386 can press a portion of the multi-layer web or film out of plane to cause permanent deformation of a portion of the film in the Z-direction. The portions of the film that pass between the notched regions 384 of the teeth 386 will be substantially unformed in the Z-direction, resulting in a plurality of deformed, raised, rib-like elements 388. The length and width of rib-like elements 388 depends on the length and width of teeth 386.

As shown by FIG. 19, the strainable network of the melt-bonded film 134f can include first thicker regions 344d, second thicker regions 344e, and bonded transitional regions 346e connecting the first and second thicker regions 344d, 344e. The second thicker regions 344e and the thinner regions 346e can form the raised rib-like elements 388 of the strainable network. The thinner regions 346e can be discontinuous or separated as they extend across the melt-bonded film 134f in both transverse and machine directions.

The rib-like elements 388 can allow the melt-bonded film 134f to undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations of melt-bonded film 134f, which are generally discernible to the normal naked eye when the melt-bonded film 134f or articles embodying the melt-bonded film 134f are subjected to an applied strain. Types of geometric deformation include, but are not limited to bending, unfolding, and rotating.

Thus, upon application of strain, the rib-like elements 388 can undergo geometric deformation before either the rib-like elements 388 or the flat regions undergo molecular-level deformation. For example, an applied strain can pull the rib-like elements 388 back into plane with the flat regions prior to any molecular-level deformation of the melt-bonded film 134f. Geometric deformation can result in significantly less resistive forces to an applied strain than that exhibited by molecular-level deformation.

In addition to improved properties thus provided by the ability to geometrically deform, the SELF'ing process also modifies melt bond between the layers of the film to create weakened regions and strengthened regions. In particularly, the film layers 138, 140. The strength of the melt bond(s) is relatively weak, so as to be less than the weakest tear resistance of the individual layers of the melt-bonded film 134f. Thus, the melt bond is broken rather than the individual layer tearing upon application of a force. Typically, tearing in the MD direction requires less applied force than tearing in the TD direction, thus in one embodiment, the melt bond strength is less than the MD tear resistance of each individual layer of the melt-bonded film 134f.

One will appreciate in light of the disclosure herein that the incrementally-stretched melt-bonded films 134d-134f can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include incrementally-stretched melt-bonded films 134d-134f to one extent or another. Trash bags and food storage bags may be particularly benefited by the films and methods of the present invention.

Figure 20:
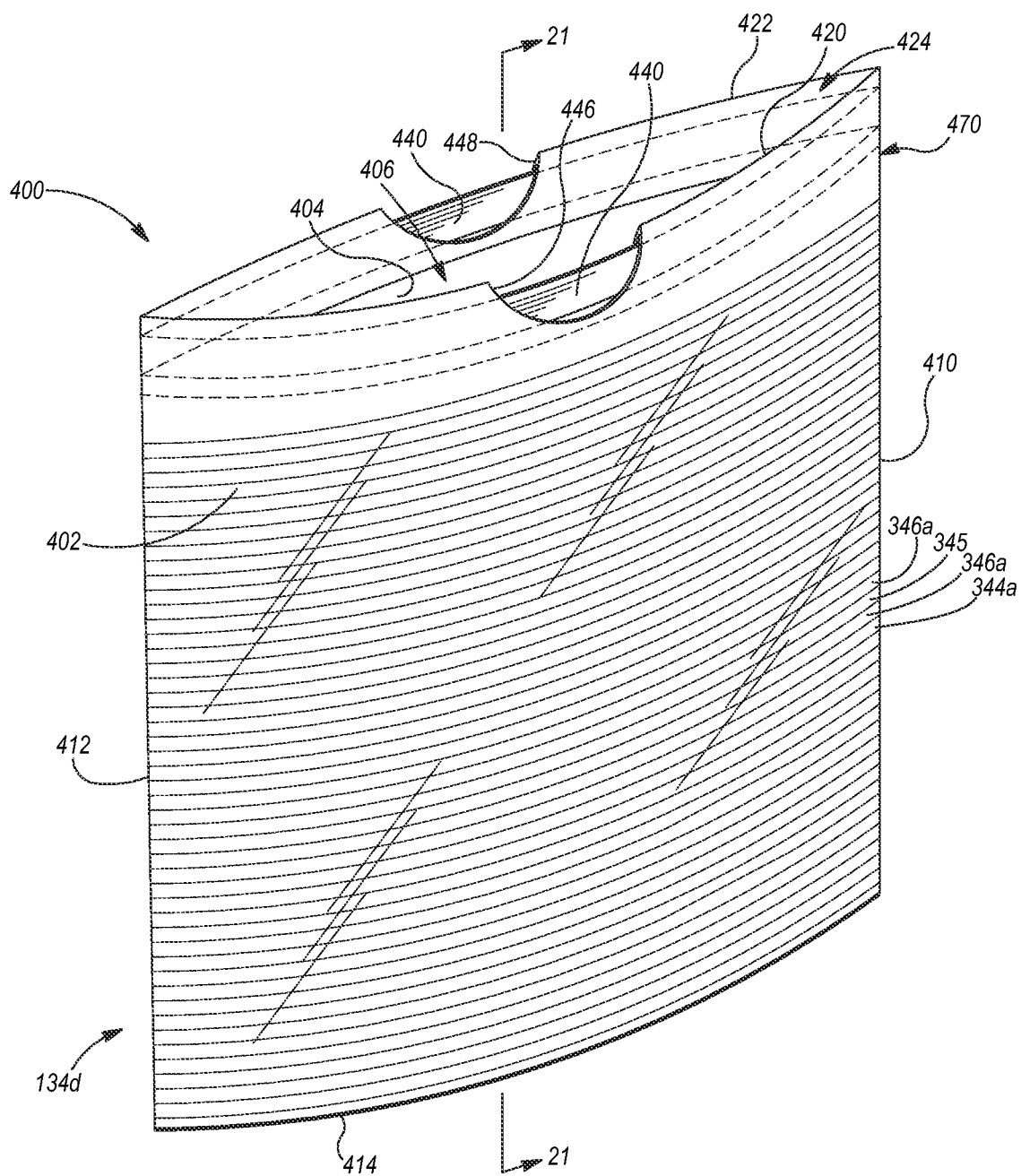
FIG. 20 illustrates a bag incorporating the melt-bonded film of FIG. 16 in accordance with one or more implementations of the present invention.
Figure 21:
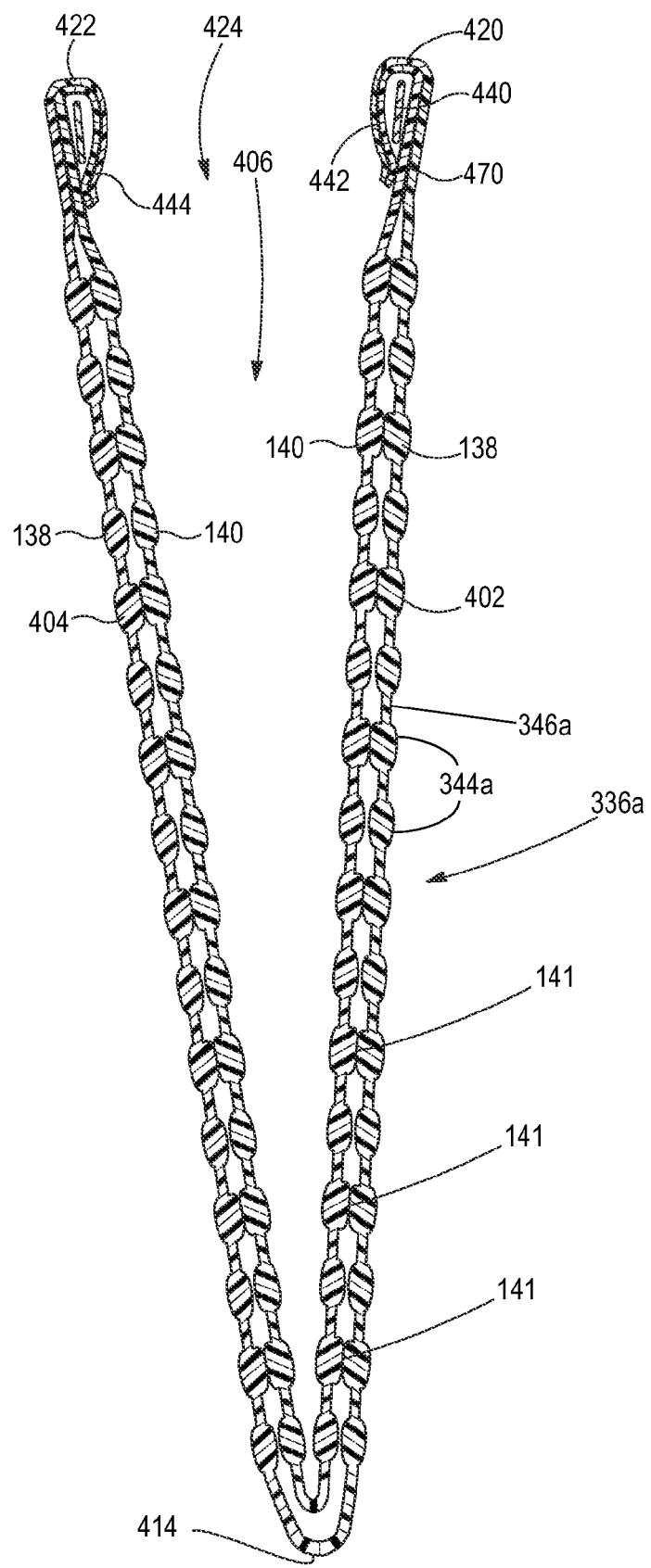
FIG. 21 illustrates a cross-sectional view of the melt-bonded film of FIG. 20 taken along the line 21-21 of FIG. 20.

FIGS. 20 and 21 illustrate an implementation of a thermoplastic bag formed from an incrementally-stretched melt-bonded film 134d. The thermoplastic bag 400 may be used as a liner for a garbage can or similar refuse container. The thermoplastic bag 400 may be similar to the thermoplastic bag 200 albeit that the walls 402, 404 are at least partially formed from incrementally-stretched melt-bonded films 134d-134f rather than melt-bonded films 134, 134a, 134b, 134b. The thermoplastic bag 400 can include a first thermoplastic sidewall 402 and an opposing second thermoplastic sidewall 404 overlying the first thermoplastic sidewall 402 to provide an interior volume 406. The first and second thermoplastic sidewalls 402, 404 may be joined along a first side edge 210, an opposing second side edge 212, and a bottom edge 214. The bottom edge 214 may extend between the first and second side edges 210, 212. First and second top edges 420, 422 of the first and second thermoplastic sidewalls 402, 404 may be un-joined or unattached. In one or more implementations the thermoplastic sidewalls 402, 404 are joined along the first and second side edges 210, 212 and along the bottom edge 214 by any suitable process, such as heat sealing. In alternative implementations, the bottom edge 214, or one or more of the side edges 210, 212 can comprise a fold.

At least a portion of the first and second top edges 420, 422 of the respective first and second sidewalls 402, 404 may remain un-joined to define an opening 424 located opposite the bottom edge 214. The opening 424 may be used to deposit items into the interior volume 406. Furthermore, the thermoplastic bag 400 may be placed into a trash receptacle. When placed in a trash receptacle, the first and second top edges 420, 422 of the respective first and second sidewalls 402, 404 may be folded over the rim of the receptacle.

The thermoplastic bag 400 may include features that facilitate its use as a liner for trash receptacles. For example, one or more implementation can include a draw tape 440 to close or reduce the opening 424. To accommodate the draw tape 440 the first top edge 420 of the first sidewall 402 may be folded back into the interior volume 406 and may be attached to the interior surface of the sidewall to form a first hem 442. Similarly, the second top edge 422 of the second sidewall 404 may be folded back into the interior volume and may be attached to the second sidewall 404 to form a second hem 444. A hem seal 470 can secure the layers of the melt-bonded film together to form the hems 442, 444.

As shown by FIG. 20, in one or more implementations, the draw tape 440 extends loosely through the first and second hems 442, 444 along the first and second top edge 420, 422. To access the draw tape 440, first and second notches 446, 448 may be disposed through the respective first and second top edges 420, 422. Pulling the draw tape 440 through the notches 446, 448 will constrict the first and second top edge 420, 422 thereby closing or reducing the opening 424. The draw tape closure may be used with any of the implementations of a thermoplastic bag described herein.

The first sidewall 402 and the second sidewall 404 can each comprise an incrementally-stretched melt-bonded film 134d. It has been found that thermoplastic films often exhibit strength characteristics that are approximately equal to the strength of the weakest layer. The MD and TD tear values of incrementally-stretched melt-bonded film 134d in accordance with one or more implementations can exhibit significantly improved strength properties. In particular, the individual values for the Dynatup, MD tear resistance, and TD tear resistance properties in incrementally-stretched melt-bonded film of one or more implementations are unexpectedly higher than the sum of the individual layers. Thus, the incrementally-stretched melt-bonded film 134d of the bag 400 can provide a synergistic effect.

More specifically, the TD tear resistance of the incrementally-stretched melt-bonded film 134d can be greater than a sum of the TD tear resistance of the individual layers. Similarly, the MD tear resistance of the incrementally-stretched melt-bonded film 134d can be greater than a sum of the MD tear resistance of the individual layers. Along related lines, the Dynatup peak load of the incrementally-stretched melt-bonded film 134d can be greater than a sum of a Dynatup peak load of the individual layers. Thus, the incrementally-stretched melt-bonded film 134d can provide a synergistic effect.

Figure 22:
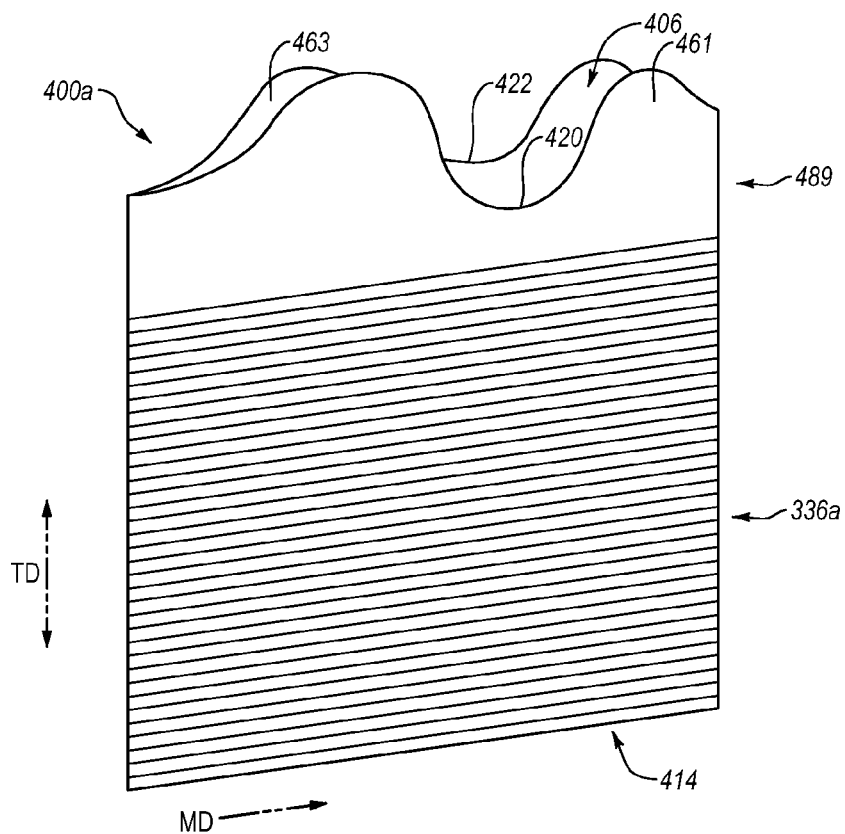
FIG. 22 illustrates a bag formed from an intermittingly melt-bonded film in accordance with one or more implementations of the present invention.

Delamination and separation of the layers 138, 140, 148, 160, 162, 163 of the incrementally-stretched melt-bonded film 134d may allow the layers to move or slide with respect to each other. An advantage of allowing the layers 138, 140, 148, 160, 162, 163 to delaminate and partially separate from each other when such forces are applied to the bag 400 may be an increased resistance to tearing or puncture due to energy absorption of the delaminating layers. When an abrupt force is applied to the sidewall of the bag, delamination and separation of the layers 138, 140, 148, 160, 162, 163 may dissipate some of the applied force by, for instance, allowing the layers to move or slide with respect to each other. Thus, when the bag is used as a liner for a trash receptacle and objects are dropped into the interior volume, the bag may resist tearing and spilling of the contents. FIG. 22 illustrates a bag 400a similar to bag 400 albeit that the bag 400a including flaps 461, 463 as a closure mechanism instead of a draw tape 440. Additionally, the bag 400a can include a portion 489 that is not incrementally stretched. The portion 489 is near the top of the bag 400a. In alternative embodiments, the un-incrementally stretched portions can also be near the bottom of the bag or in other areas of the bag 400a.

Figure 23:
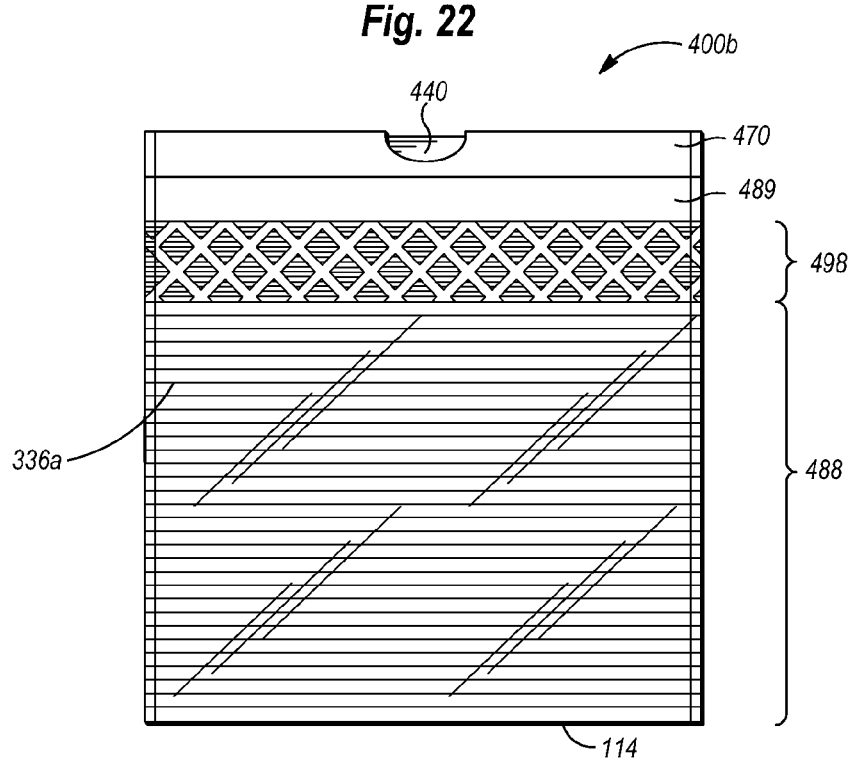
FIG. 23 illustrates another bag formed from an intermittingly melt-bonded film in accordance with one or more implementations of the present invention.

The bags 400, 400a include TD incrementally-stretched melt-bonded films 134d. One will appreciate that in light of the disclosure herein that the bags can include any of the melt-bonded films 134-134f described herein or combinations thereof. For example, FIG. 23 illustrates a thermoplastic bag 400b including a first area 488 including a TD incrementally-stretched melt-bonded film 134d, a second area 498 including a SELFed incrementally-stretched melt-bonded film 134f, and a third region 489 that is devoid of incremental stretching an instead is a melt-bonded film 134, 134a, 134b. The area devoid of incremental stretching can be positioned near the hem seal 470 that extends across the bag 400b.

Figure 24:
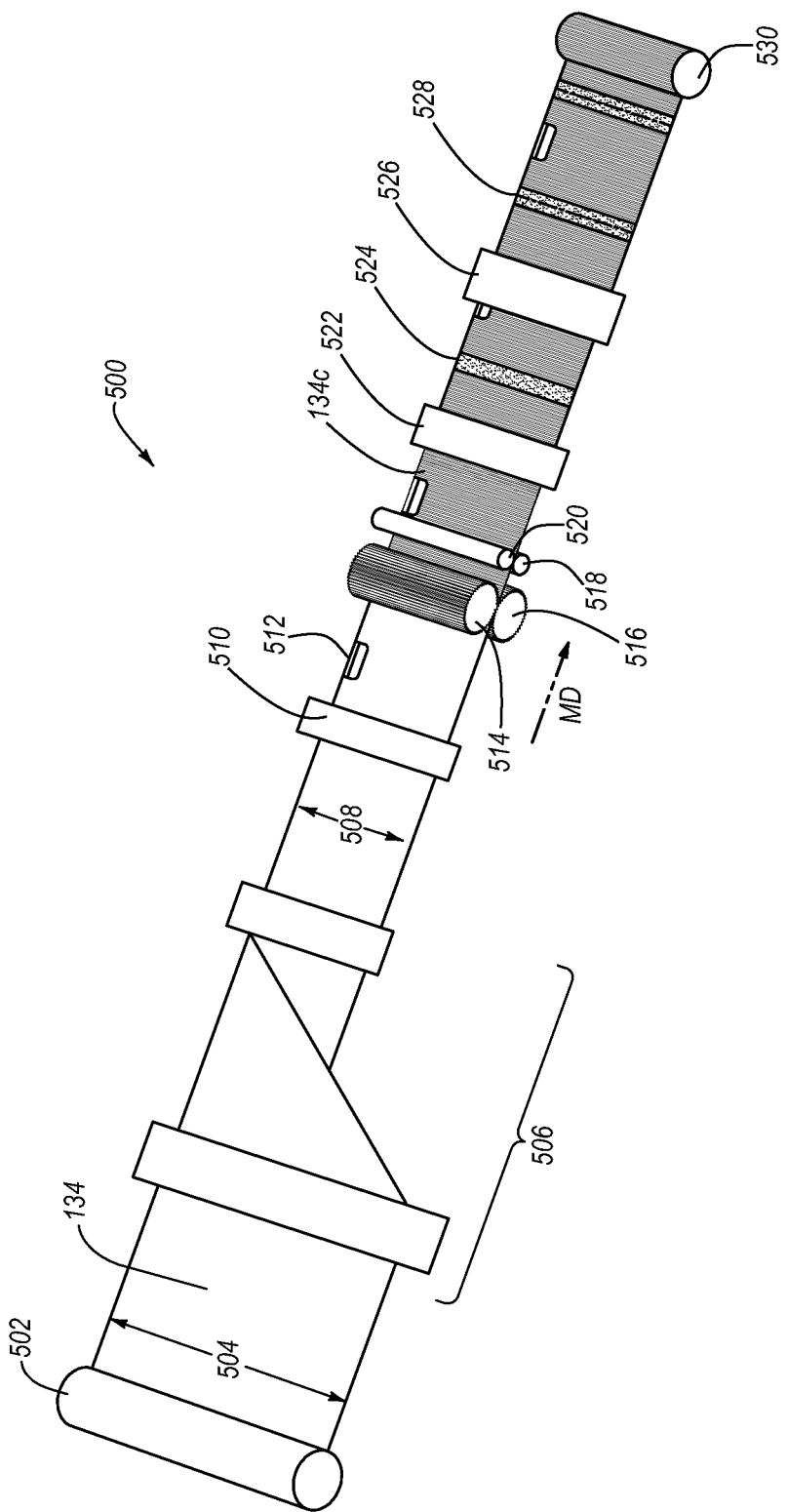
FIG. 24 illustrates a schematic diagram of a bag manufacturing process in accordance with one or more implementations of the present invention.

FIG. 24 illustrates an exemplary embodiment of a high-speed manufacturing process 500. The high-speed manufacturing process 500 can form a bag from a melt-bonded film 134. Optionally, the process 500 can also incrementally stretch and tailor the melt bond(s) between the layers of the melt-bonded film. According to the exemplary process, a melt-bonded film 134 is unwound from a roll 502 and directed along a machine direction. The melt-bonded film 134 can pass through a folding operation 506 can fold the melt-bonded film 134 to produce the sidewalls of the finished bag. The folding operation 506 can fold the melt-bonded film 134 in half along the transverse direction. In particular, the folding operation 506 can move a first edge adjacent to a second edge, thereby creating a folded edge that can become the bottom edge of a bag. The folding operation 506 thereby provides a first film half and an adjacent second web half. The overall width 508 of the second film half can be half the width 504 of the first film half 154 of the melt-bonded film 134.

The process 500 can further include a draw tape operation 510 that inserts a draw tape 512 into the melt-bonded film 134. The process 500 can also optionally include a process to modify the melt bond between the layers of the melt-bonded film 134. For example, the process 500 can pass between one or more pairs of cylindrical intermeshing rollers 514, 516 to modify the melt bond between the layers of the film 134, incrementally stretch the melt-bonded film 134, and impart a ribbed pattern thereon. For example, FIG. 24 illustrates that the melt-bonded film 134 can pass through a pair of MD intermeshing rollers 312, 314. In alternative implementations, the melt-bonded film 134 can pass through TD intermeshing rollers 352, 354, through TD intermeshing rollers 352, 354 and MD intermeshing rollers 312, 314, or through SELFing rollers 371, 373.

The rollers 514, 516 may be arranged so that their longitudinal axes are perpendicular to the machine direction. Additionally, the rollers 514, 516 may rotate about their longitudinal axes in opposite rotational directions. In various embodiments, motors may be provided that power rotation of the rollers 514, 516 in a controlled manner. As the melt-bonded film 134 passes between the rollers 514, 516 the ridges of the intermeshing rollers can impart a ribbed pattern, incrementally stretch the film 134, modify the melt-bond, and thereby create an incrementally-stretched melt-bonded film 134b.

During the manufacturing process 500, the incrementally-stretched melt-bonded film 134b can also pass through a pair of pinch rollers 518, 520. The pinch rollers 518, 520 can be appropriately arranged to grasp the incrementally-stretched melt-bonded film 134b. The pinch rollers 518, 520 may facilitate and accommodate the incrementally-stretched melt-bonded film 134b.

Furthermore, a sealing operation 522 can form the parallel side edges of the finished bag by forming heat seals 524 between adjacent portions of the incrementally-stretched melt-bonded film 134b. The heat seals 524 may be spaced apart along the incrementally-stretched melt-bonded film 134b. The sealing operation 522 can form the heat seals 524 using a heating device, such as, a heated knife.

A perforating operation 526 may form a perforation in the heat seals 524 using a perforating device, such as, a perforating knife. The perforations in conjunction with the folded outer edge can define individual bags that may be separated from the incrementally-stretched melt-bonded film 134b. A roll 530 can wind the incrementally-stretched melt-bonded film 134b embodying the finished bags for packaging and distribution. For example, the roll 530 may be placed into a box or bag for sale to a customer.

In still further implementations, the incrementally-stretched melt-bonded film 134b may be cut into individual bags along the heat seals 524 by a cutting operation. In another implementation, the incrementally-stretched melt-bonded film 134b may be folded one or more times prior to the cutting operation. In yet another implementation, the side sealing operation 522 may be combined with the cutting and/or perforation operations 526.

One will appreciate in light of the disclosure herein that the process 500 described in relation to FIG. 24 can be modified to omit or expanded acts, or vary the order of the various acts as desired. For example, the melt-bonded film 134 can be folded prior to winding on the roll 502.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. Moreover, any combination of the above-described elements in all possible variations thereof is encompassed by the invention unless otherwise indicated herein or otherwise clearly contradicted by context. All changes that come within the meaning and range of equivalency of the claims are to be embraced within their scope.

We claim:

1. A method of forming a multi-layered thermoplastic bag with tailored bond strength of the melt bond between the layers of the bag, the method comprising:
    extruding a first thermoplastic layer of film;
    extruding a second thermoplastic layer of film, the second thermoplastic layer of film being incompatible with the first thermoplastic layer of film;
    joining the first thermoplastic layer of film directly to the second thermoplastic layer of film before a frost line area while each of the first and second thermoplastic layers of film remain in a melt state from the extruding;
    solidifying the joined first thermoplastic layer of film and second thermoplastic layer of film at the frost line area to form a melt-bonded film with a melt bond strength between the first thermoplastic layer of film and the second thermoplastic layer of film that is less than a weakest tear strength of the first thermoplastic layer of film and the second thermoplastic layer of film whereby forces acting on the melt-bonded film are first absorbed by breaking the melt bond between layers rather than, or prior to, tearing or otherwise causing failure of either one of the first and second layers of the melt-bonded film;
    regulating temperature during the solidifying to establish the frost line area; and
    forming the melt-bonded film into a thermoplastic bag.

2. The method as recited in claim 1, wherein joining the first thermoplastic layer of film directly to the second thermoplastic layer of film comprises joining the first thermoplastic layer of film directly to the second thermoplastic layer of film outside of one or more extrusion dies used to form the first thermoplastic layer of film and the second thermoplastic layer of film.

3. The method as recited in claim 2, wherein the extruding of the first and second layers further comprises:
    extruding the first thermoplastic layer of film and the second thermoplastic layer of film using a dual-ring die;
    forming the first thermoplastic layer of film into a first tubular stock; and
    forming the second thermoplastic layer of film into a second tubular stock inside of the first tubular stock.

4. The method as recited in claim 3, wherein joining the first thermoplastic layer of film directly to the second thermoplastic layer of film comprises causing the second tubular stock to abut against the first tubular stock.

5. The method as recited in claim 1, wherein the first thermoplastic layer of film comprises a polyethylene material.

6. The method as recited in claim 5, wherein the first thermoplastic layer of film comprises linear low-density polyethylene.

7. The method as recited in claim 6, further comprising varying a thickness of the first thermoplastic layer of film during the extrusion.

8. The method as recited in claim 7, wherein varying the thickness of the film causes melt fracture of the first thermoplastic layer of film during extrusion.

9. The method as recited in claim 6, wherein the second thermoplastic layer of film comprises polypropylene or polystyrene.

10. The method as recited in claim 6, wherein the second thermoplastic layer of film comprises high density polyethylene with a first melt index that is one-fourth or less than a second melt index of the linear low-density polyethylene forming the first thermoplastic layer of film.

11. The method as recited in claim 1, further comprising modifying the bond strength of the melt bond between the first thermoplastic layer of film and the second thermoplastic layer of film by intermittingly separating the first thermoplastic layer of film from the second thermoplastic layer of film at the melt bond.

12. The method as recited in claim 11, wherein separating the first thermoplastic layer of film from the second thermoplastic layer of film comprises cold deforming the melt-bonded film.

13. The method as recited in claim 12, wherein cold deforming the melt-bonded film comprises one or more selected from the group consisting of of ring rolling or SELFing.

14. A method of forming a multi-layered thermoplastic bag with tailored bond strength of the melt bond between the layers of the bag, the method comprising:
   extruding a first thermoplastic layer of film;
   extruding a second thermoplastic layer of film, the second thermoplastic layer of film being incompatible with the first thermoplastic layer of film;
   joining the first thermoplastic layer of film directly to the second thermoplastic layer of film before a frost line area while each of the first and second thermoplastic layers of film remain in a melt state from the extruding;
   solidifying the joined first thermoplastic layer of film and second thermoplastic layer of film at the frost line area to form a melt-bonded film with a melt bond strength between the first thermoplastic layer of film and the second thermoplastic layer of film that, when subjected to stress consistent with use as a liner for a trash receptacle, causes the first and second thermoplastic layers to at least partially delaminate from each other at the melt bond and thereby provide increased resistance to tear or puncture of the first and second layers due to energy absorption of the delaminating;
   regulating temperature during the solidifying to establish the frost line area; and
   forming the melt-bonded film into a thermoplastic bag.

15. The method as recited in claim 14, wherein joining the first thermoplastic layer of film directly to the second thermoplastic layer of film comprises joining the first thermoplastic layer of film directly to the second thermoplastic layer of film outside of one or more extrusion dies used to form the first thermoplastic layer of film and the second thermoplastic layer of film.

16. The method as recited in claim 15, wherein the extruding of the first and second layers further comprises:
   extruding the first thermoplastic layer of film and the second thermoplastic layer of film using a dual-ring die;
   forming the first thermoplastic layer of film into a first tubular stock; and
   forming the second thermoplastic layer of film into a second tubular stock inside of the first tubular stock,
   wherein joining the first thermoplastic layer of film directly to the second thermoplastic layer of film comprises causing the second tubular stock to abut against the first tubular stock.

* * * * *